United States Patent
Imakubo et al.

(10) Patent No.: US 12,020,492 B2
(45) Date of Patent: Jun. 25, 2024

(54) CELL ANALYSIS METHOD, CELL ANALYSIS DEVICE, AND CELL ANALYSIS SYSTEM

(71) Applicant: SYSMEX CORPORATION, Kobe (JP)

(72) Inventors: Momoko Imakubo, Kobe (JP); Jianyin Lu, Kobe (JP); Kentaro Shirai, Kobe (JP); Eri Katsumata, Kobe (JP); Yuji Okamoto, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 524 days.

(21) Appl. No.: 17/105,047

(22) Filed: Nov. 25, 2020

(65) Prior Publication Data

US 2021/0164883 A1    Jun. 3, 2021

(30) Foreign Application Priority Data

Nov. 29, 2019   (JP) .................. 2019-217162

(51) Int. Cl.
| | |
|---|---|
| *G06V 20/69* | (2022.01) |
| *G01N 15/1429* | (2024.01) |
| *G01N 15/1433* | (2024.01) |
| *G01N 15/1434* | (2024.01) |
| *G06T 7/00* | (2017.01) |
| *G06V 10/70* | (2022.01) |
| *G01N 15/00* | (2006.01) |
| *G01N 15/10* | (2006.01) |
| *G01N 15/14* | (2006.01) |

(52) U.S. Cl.
CPC ......... *G06V 20/69* (2022.01); *G01N 15/1431* (2013.01); *G01N 15/1433* (2024.01);
(Continued)

(58) Field of Classification Search
CPC .............. G06V 10/87; G01N 15/1431; G01N 15/1436; G01N 15/1475;
(Continued)

(56) References Cited

U.S. PATENT DOCUMENTS

2009/0204557 A1    8/2009  Zhang
2010/0053211 A1*   3/2010  Ingermanson .......... G06F 18/40
                                                        345/626
(Continued)

FOREIGN PATENT DOCUMENTS

CN    108362628 A    8/2018
JP    2002-521066 A   7/2002
(Continued)

OTHER PUBLICATIONS

S.B. Luo et al., "A High Performance of Single Cell Imaging Detection with Deep Learning", 2019 IEEE 4th International Conference on Image, Vision and Computing (ICIVIC), IEEE, Jul. 5, 2019, pp. 356-360.
(Continued)

*Primary Examiner* — Jonathan M Hansen
*Assistant Examiner* — Omar H Nixon
(74) *Attorney, Agent, or Firm* — Crowell & Moring LLP

(57) ABSTRACT

The present invention is to facilitate analysis of a plurality of analysis items. A cell analysis method for analyzing cells is provided in which data for analysis of cells contained in a sample are generated, and an artificial intelligence algorithm to be the input destination of the generated analysis data is selected from among a plurality of artificial intelligence algorithms, data indicating the properties of the cells are generated based on the analysis data via the artificial intelligence algorithm.

16 Claims, 37 Drawing Sheets

(52) U.S. Cl.
CPC ....... *G01N 15/1436* (2013.01); *G06T 7/0012* (2013.01); *G06V 10/87* (2022.01); *G01N 2015/0019* (2013.01); *G01N 2015/1028* (2024.01); *G01N 2015/1495* (2013.01); *G06T 2207/10056* (2013.01); *G06T 2207/10064* (2013.01); *G06T 2207/20084* (2013.01); *G06T 2207/30024* (2013.01)

(58) Field of Classification Search
CPC ... G01N 2015/0019; G01N 2015/1081; G01N 2015/1495; G06T 7/0012; G06T 2207/10056; G06T 2207/10064; G06T 2207/20084; G06T 2207/30024
See application file for complete search history.

(56) References Cited

U.S. PATENT DOCUMENTS

| | | | | |
|---|---|---|---|---|
| 2015/0064722 | A1* | 3/2015 | Takeda | G01N 33/582 435/7.23 |
| 2016/0289669 | A1* | 10/2016 | Fan | C12Q 1/6874 |

FOREIGN PATENT DOCUMENTS

| | | |
|---|---|---|
| JP | 2006-333710 A | 12/2006 |
| JP | 2014-529158 A | 10/2014 |
| JP | 2018-185759 A | 11/2018 |
| JP | 2019-095212 A | 6/2019 |
| JP | 2019-095853 A | 6/2019 |
| WO | 2015/065697 A1 | 5/2015 |
| WO | 2017/061155 A1 | 4/2017 |
| WO | 2017/104556 A1 | 6/2017 |
| WO | 2017/214023 A1 | 12/2017 |

OTHER PUBLICATIONS

The extended European search report dated Apr. 15, 2021 in a counterpart European patent application No. 20210018.6.
Communication pursuant to Article 94(3) EPC, dated Mar. 13, 2023, pp. 1-5, issued in European patent application No. 20210018.6, European Patent Office, Rijswijk, Netherlands.
The Japanese Office Action dated Sep. 26, 2023, in a counterpart Japanese patent application No. 2019-217162.
The Decision of Refusal dated Jan. 9, 2024 in a counterpart Japanese patent application No. 2019-217162.

* cited by examiner

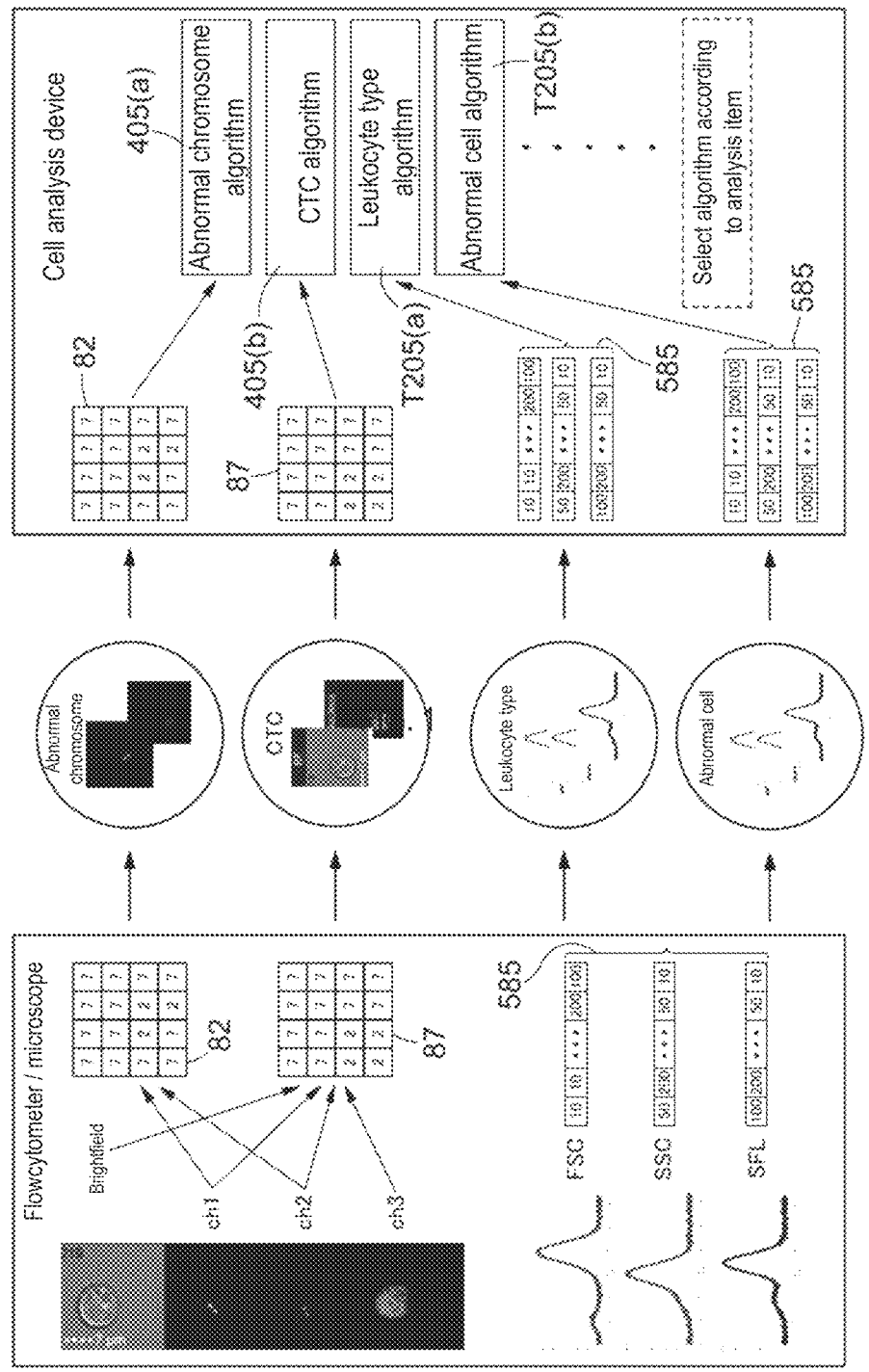

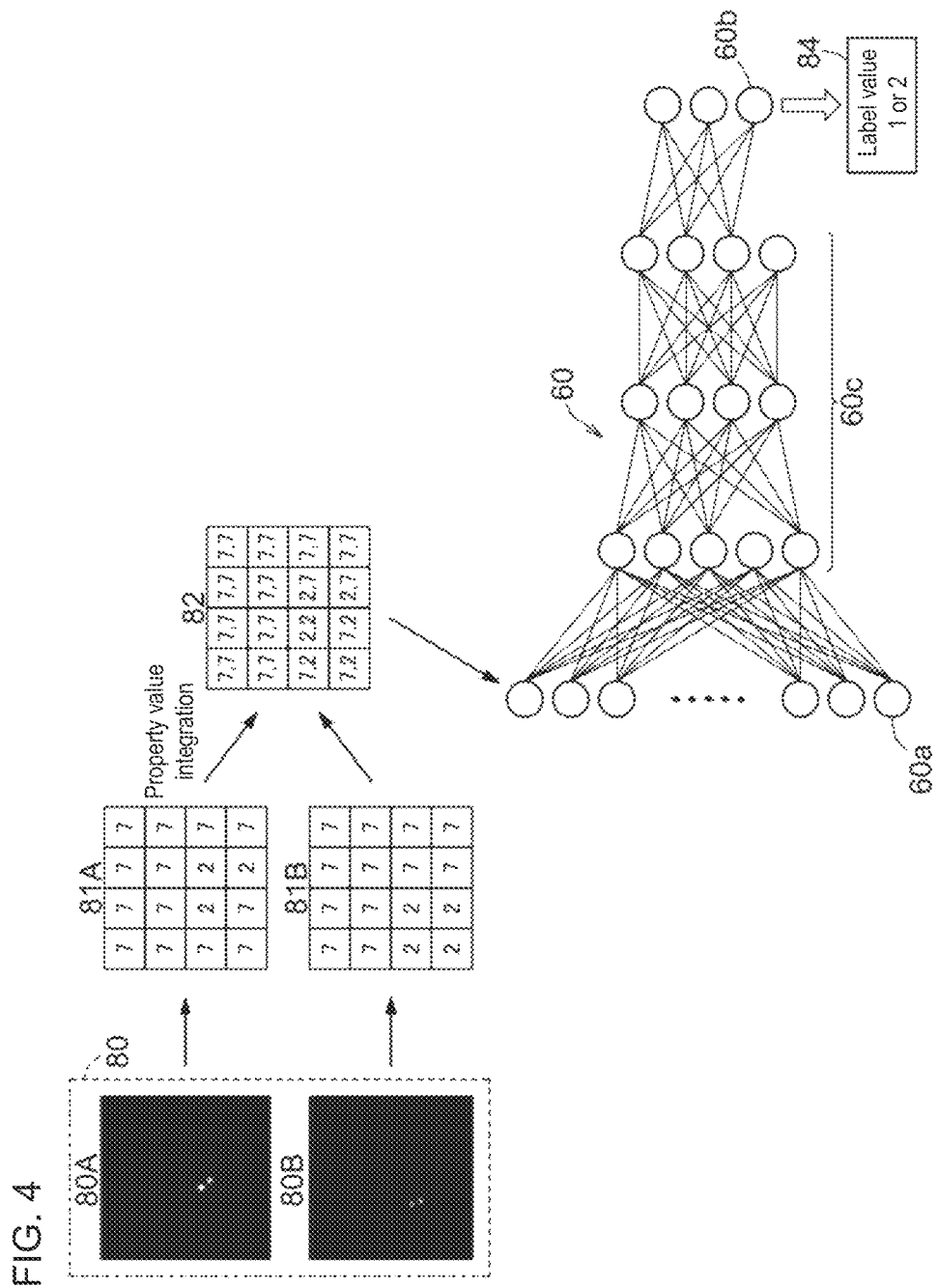

| Exam item | Probe name | 1st Fluorescent label image | 2nd Fluorescent label image | Display image | Fluorescent label pattern | Posi / Nega |
|---|---|---|---|---|---|---|
| BCR / ABL Fusion gene | DF | | | | 1st Fluorescent label: 1<br>2nd Fluorescent label: 1<br>Fusion Fluorescent label: 2<br><br>(Minor BCR/ABL pattern) | Positive |
| | ES | | | | 1st Fluorescent label: 1<br>2nd Fluorescent label: 1<br>Fusion Fluorescent label: 2<br><br>(Minor BCR/ABL pattern) | Positive |
| | DF | | | | 1st Fluorescent label: 2<br>2nd Fluorescent label: 1<br>Fusion Fluorescent label: 1<br><br>(Chromosome 9 reconstruction: Ch.9 or 9q deletion) | Positive |
| | ES | | | | 1st Fluorescent label: 1<br>2nd Fluorescent label: 1<br>Fusion Fluorescent label: 1<br><br>(Chromosome 9 reconstruction: Ch.9 or 9q deletion) | Positive |
| | DF | | | | 1st Fluorescent label: 1<br>2nd Fluorescent label: 1<br>Fusion Fluorescent label: 1<br><br>(9q and 22q deletion pattern) | Positive |
| | ES | | | | 1st Fluorescent label: 1<br>2nd Fluorescent label: 1<br>Fusion Fluorescent label: 1<br><br>(9q and 22q deletion pattern) | Positive |

● 1st Fluorescent label　　◦ 2nd Fluorescent label　　○ Fusion fluorescent label　　(⚬) Nuclear region

FIG. 7

| Exam item | Probe name | 1st Fluorescent label image | 2nd Fluorescent label image | Display image | Fluorescent label pattern | Posi / Nega |
|---|---|---|---|---|---|---|
| ALK gene | ALK | ● ● | ● ● | (○ ○) | 1st Fluorescent label: 0<br>2nd Fluorescent label: 0<br>Fusion Fluorescent label: 2 | Negative |
| | ALK | ● ● | ● ● | (● ●) | 1st Fluorescent label: 0<br>2nd Fluorescent label: 0<br>Fusion Fluorescent label: 2 | Negative |
| | ALK | ● ● | ● ● | (● ○) | 1st Fluorescent label: 1<br>2nd Fluorescent label: 1<br>Fusion Fluorescent label: 1 | Positive |
| | ALK | ● ● | ● ● | (● ● ● ●) | 1st Fluorescent label:2<br>2nd Fluorescent label:2<br>Fusion Fluorescent label: 0 | Positive |
| Chromosome 5 long arm deletion | 5q | ● ● | ● ● | (● ● ● ●) | 1st Fluorescent label: 2<br>2nd Fluorescent label: 2<br>Fusion Fluorescent label: 2 | Negative |
| | 5q | ● | ● ● | (● ●) | 1st Fluorescent label: 1<br>2nd Fluorescent label: 2<br>Fusion Fluorescent label: 0 | Positive |
| Chromosome 8 trimming | 17q | ●● ● | | (●● ●) | 1st Fluorescent label: 3 | Positive |

● 1st Fluorescent label    ● 2nd Fluorescent label    ○ Fusion fluorescent label    (⌒) Nuclear region

FIG. 8

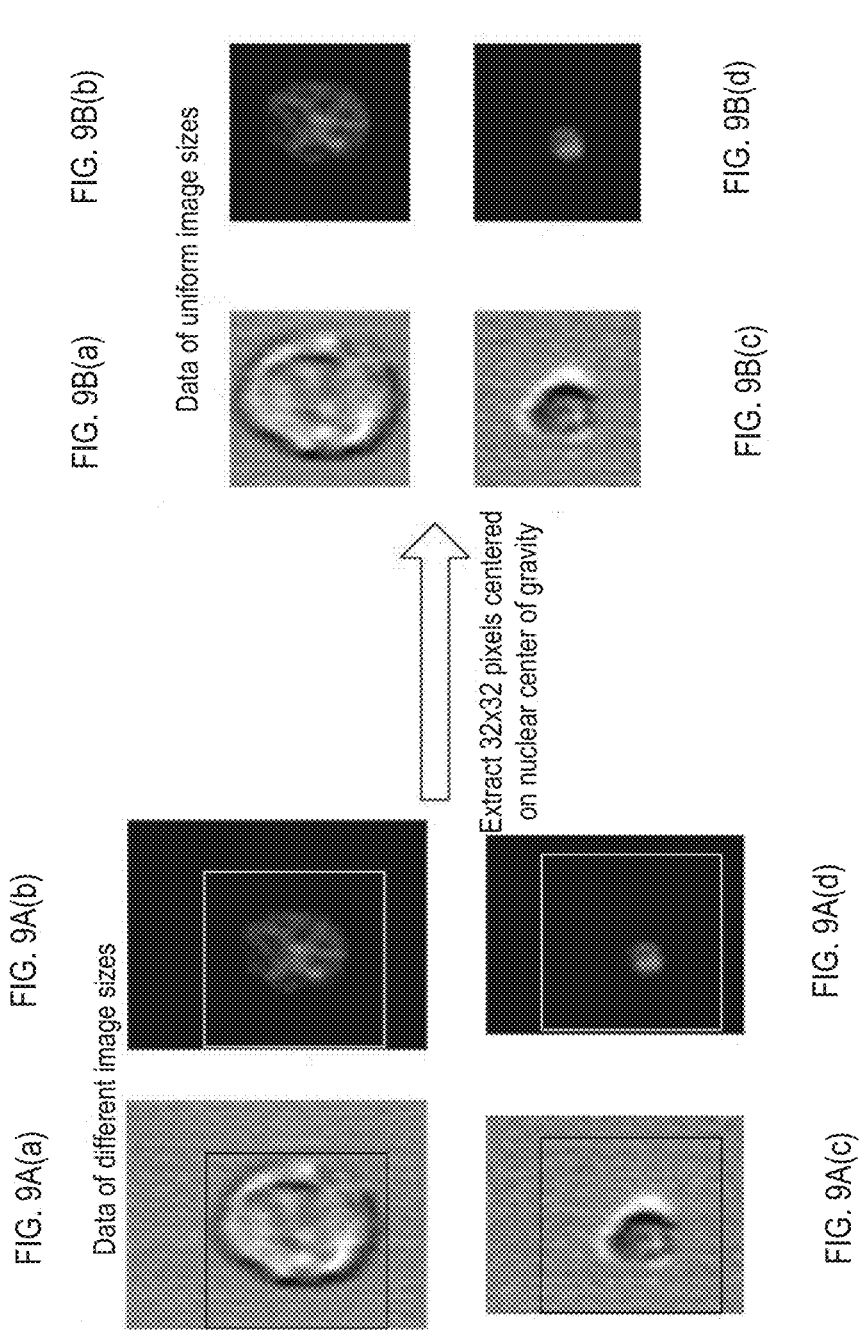

| Exam item | Target site | Analysis item | Fluorescence wavelength range | Imaging channel | Artificial intelligence algorithm |
|---|---|---|---|---|---|
| Abnormal chromosome | Nucleus (chromosome) | BCR-ABL | Green Yellow | ch1 ch2 | |
| | | PML-RARA | Green Yellow | ch1 ch2 | |
| | | IGH-CCND1 IGH-FGFR3 IGH-MAF | Green Yellow Blue Red | ch1 ch2 ch3 ch4 | |
| Peripheral circulating tumor cell | Nucleus | CTC | Red Brightfield | ch4 Brightfield | No. 2 |

FIG. 20

| Cell type | Label value |
|---|---|
| Non-nucleated cells | 0 |
| Neutrophils (NEUT) | 1 |
| Lymphocytes (LYMPH) | 2 |
| Monocytes (MONO) | 3 |
| Eosinophils (EO) | 4 |
| Basophils (BASO) | 5 |
| Immature granulocytes (IG) | 6 |
| Abnormal cell (blood-derived cell other than the 5 types) | 7 |

FIG. 24

CELL ANALYSIS METHOD, CELL ANALYSIS DEVICE, AND CELL ANALYSIS SYSTEM

RELATED APPLICATIONS

This application claims priority to Japanese Patent Application No. 2019-217162, filed on November 29, 2019, the entire content of which is incorporated herein by reference.

BACKGROUND OF THE INVENTION

1. Field of the Invention

The present invention relates to a cell analysis method, cell analysis device, cell analysis system, and cell analysis program.

2. Description of the Related Art

WIPO Patent Publication No. 2015/065697 discloses a method of applying a filtered microscope image to a trained machine learning model to determine centers and boundaries of cells of a specific type, count the determined cells, and output an image of the cells.

SUMMARY OF THE INVENTION

In an examination, a plurality of analysis items are often analyzed. However, as the number of analysis items increases, it becomes necessary to increase the number of trainings of the machine learning model and the types of parameters to be input to the machine learning model in order to reduce determination errors, and the training requires extensive time, and the machine learning model becomes large as necessary.

The present invention provides a cell analysis method, a cell analysis device, a cell analysis system, and a cell analysis program that facilitate analysis of a plurality of analysis items.

One embodiment of the present invention relates to a cell analysis method for analyzing cells. The cell analysis method generates data for analysis of cells (82, 87, 585) contained in a sample, selects an artificial intelligence algorithm (60, 63, 563) from a plurality of artificial intelligence algorithms (60, 63, 563), inputs the generated data for analysis (82, 87, 585) to the selected artificial intelligence algorithm (60, 63, 563), and generates, by the selected artificial intelligence algorithm (60, 63, 563), data indicating properties of the cells (84, 88, 582) based on the generated data for analysis (82, 87, 585).

One embodiment of the present invention relates to a cell analysis device (400A, 200T) for analyzing cells. The cell analysis device (400A, 200T) is provided with a control unit (40A, 20T) configured to select an artificial intelligence algorithm (60, 63, 560) from a plurality of artificial intelligence algorithms (60, 63, 560); input data for analysis of cells contained in a sample (82, 87, 585) to the selected artificial intelligence algorithm (60, 63, 560); and generate, by the selected artificial intelligence algorithm (60, 63, 560), data indicating properties of the cells (84, 88, 582) based on the data for analysis (82, 87, 585).

One embodiment of the present invention relates to a cell analysis system (1000). Cell analysis system (1000) includes a flow cell (110) having a flow path (111) through which a sample containing cells flows, a light source (120, 121, 122, 123) for irradiating light on the sample flowing through the flow path (111), an imaging unit (160) for imaging cells in the sample irradiated with the light; and a control unit (40A), wherein the control unit (40A) is configured to generate data for analysis of cells contained in the sample (82, 87) flowing through the flow path (111) and imaged by the imaging unit (160), select an artificial intelligence algorithm (60, 63) from a plurality of artificial intelligence algorithms (60, 63), input the generated data for analysis (82, 87) to the selected artificial intelligence algorithm (60, 63), and generate, by the selected artificial intelligence algorithm (60, 63), data indicating properties of the cells (80, 85) based on the data for analysis.

In one embodiment of the present invention, a cell analysis system (5000) includes a flow cell (4113) having a flow path (4113a) through which a sample containing cells flows, a signal acquiring unit (610) that acquires signals from cells in a sample flowing through the flow path, and a control unit (20T), wherein the control unit (20T) is configured to acquire signal strengths for individual cells passing through the flow path (4113a), generate analysis data (585) from the acquired signal strengths, select an artificial intelligence algorithm (560, 563) from a plurality of artificial intelligence algorithms (560, 563), and generate, by the selected artificial intelligence algorithm (560, 563), data indicating properties of the cells (582) based on the data for analysis.

One embodiment of the present invention relates to a cell analysis system (1000). The cell analysis system (1000) includes a microscope (700) with a stage for placing a slide smeared with a sample containing cells, an imaging unit (710d) that images the cells in the sample magnified by the microscope, and a control unit (40A), wherein the control unit (40A) is configured to generate data for analysis (82, 87) of cells contained in the sample smeared on the slide and imaged by the imaging unit, select an artificial intelligence algorithm (60, 63) from a plurality of artificial intelligence algorithms (60, 63), input the generated data for analysis to the selected artificial intelligence algorithm, and generate, by the selected artificial intelligence algorithm, data indicating properties of the cells (80, 85) based on the data for analysis.

One embodiment of the present invention relates to a cell analysis program for analyzing cells. The cell analysis program uses a computer execute processes including a step of selecting an artificial intelligence algorithm (60, 63, 560) as an input destination of the analysis data (82, 87, 5845) of the cells contained in the sample from among a plurality of artificial intelligence algorithms (60, 63, 560), and a step of generating data (84, 88, 582) indicating the properties of the cells based on the analysis data (82, 87, 585) via the selected artificial intelligence algorithm (60, 63, 560).

According to the present invention, analysis of a plurality of analysis items is facilitated in cell analysis.

BRIEF DESCRIPTION OF THE DRAWINGS

FIG. 1 shows an outline of the present invention;

FIG. 2A shows a method for generating positive training data; FIG. 2B shows a method for generating negative training data;

FIG. 4 shows a method of generating analysis data for analyzing chromosomal abnormalities, and a method of analyzing cells by a trained first artificial intelligence algorithm 60;

FIG. 5B is a cell different from FIG. 5A, the left shows the image of channel 2, and the right shows the image of channel 2;

FIG. 7 shows an example of a fluorescent labeling pattern;

FIG. 8 shows an example of a fluorescent labeling pattern;

FIG. 9A(a), FIG. 9A(b), FIG. 9A(c), FIG. 9A(d), FIG. 9B(a), FIG. 9B(b), FIG. 9B(c), and FIG. 9B(d) show a method of generating training data for training a second artificial intelligence algorithm 53 for analyzing peripheral circulating tumor cells;

FIG. 10A shows a method for generating positive training data; FIG. 10B shows a method for generating negative training data;

FIG. 20 shows an example of an algorithm database storing an artificial intelligence algorithm according to the first embodiment;

FIG. 24 shows an example of a label value;

DETAILED DESCRIPTION OF THE PREFERRED EMBODIMENTS

Figures 2A, 2B:
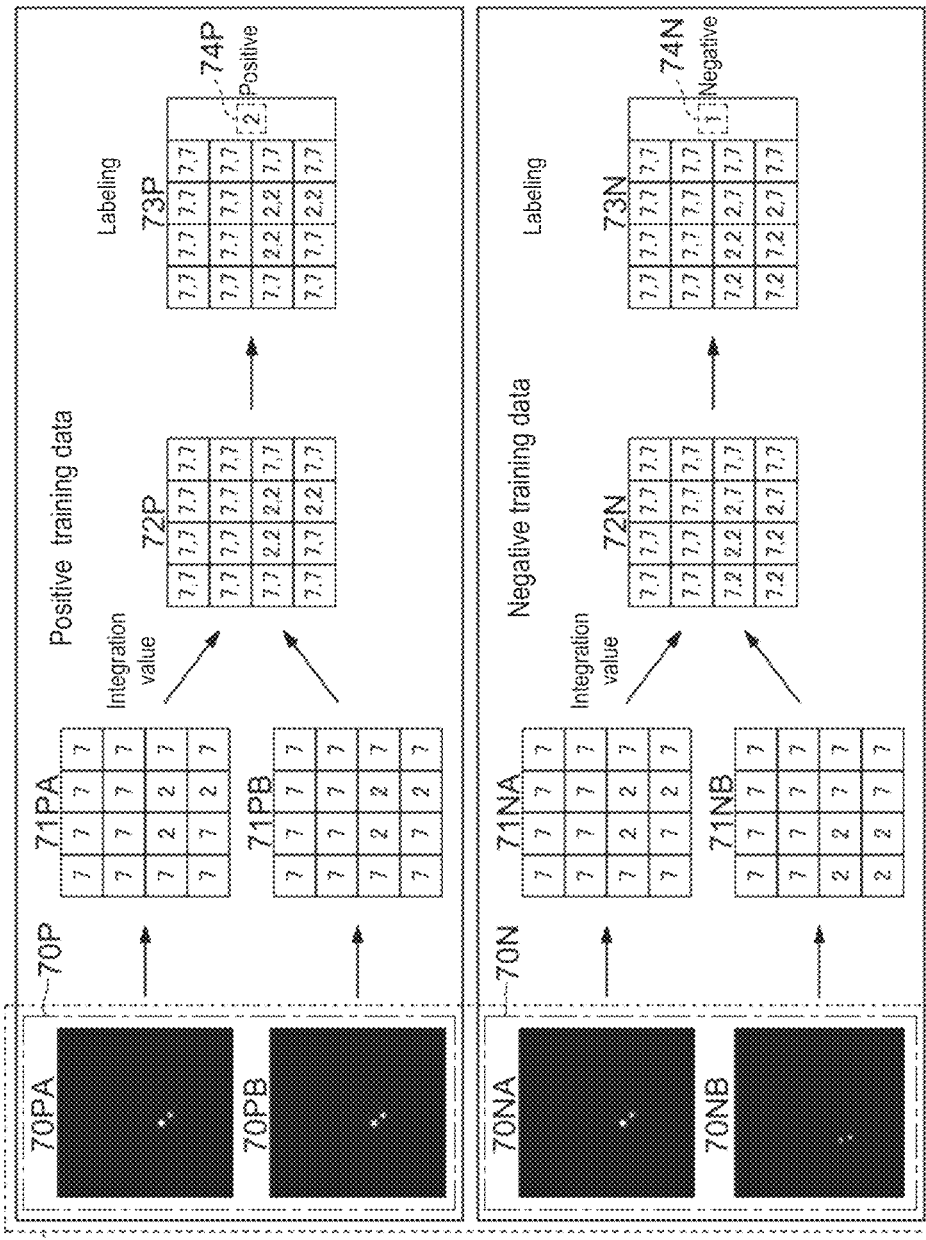
FIGS. 2A and 2B show a method of generating training data for training a first artificial intelligence algorithm 50 for analyzing chromosomal abnormalities.

I. Summary of the Embodiment of the Invention

A summary of an embodiment of the present invention will be described with reference to FIG. 1.

An embodiment of the present invention relates to a cell analysis method for analyzing cells. As shown in FIG. 1, the cell analysis method characteristically generates analysis data 82, 87, or 585 of the cells contained in the sample, and selects an artificial intelligence algorithm as an input destination of the generated analysis data from among a plurality of artificial intelligence algorithms 405(a), 405(b), T205(a) and T205(b) depending on the exam item. The selected artificial intelligence algorithm generates data indicating the properties of the cells to be analyzed from the input analysis data. As shown in FIG. 1, when analyzing cells, a flow cytometer or a microscope can be used to obtain an image of the cells and waveform data based on the signal intensity from the cells. The kind of data collected from cells is predetermined according to exam items or analysis items such as chromosomal aberration test, peripheral circulating tumor cell test, peripheral blood test, urinalysis. Therefore, in the present invention, an artificial intelligence algorithm suitable for each analysis is selected according to the exam item or the analysis item.

II. First Embodiment

The first embodiment relates to a method of analyzing a cell from an image of the cell using an artificial intelligence algorithm.

1. Summary of Cell Analysis Method

The present embodiment relates to a cell analysis method for analyzing cells using an artificial intelligence algorithm. In the cell analysis method, an analysis target image obtained by capturing an image of an analysis target cell is acquired by causing a sample containing cells to flow in a flow path and imaging the cells passing through the flow path. The analysis data to be input to the artificial intelligence algorithm are generated from the acquired analysis target image. When the analysis data are input to the artificial intelligence algorithm, the artificial intelligence algorithm generates data indicating the properties of the cells included in the analysis target image. The analysis target image is preferably an image of individual cells passing through the flow path.

In the present embodiment, the sample may be a sample prepared from a specimen collected from a subject. The sample may include, for example, blood samples such as peripheral blood, venous blood, arterial blood, urine samples, and body fluid samples other than blood and urine. Body fluids other than blood and urine may include bone marrow, ascites, pleural effusion, spinal fluid and the like. Body fluids other than blood and urine may be simply referred to as "body fluid". The blood is preferably peripheral blood. For example, the blood may be peripheral blood collected by using an anticoagulant such as ethylenediaminetetraacetate sodium salt or potassium salt) and heparin sodium.

The sample can be prepared from the specimen according to a known method. For example, an examiner collects nucleated cells by subjecting a blood sample collected from a subject to centrifugation or the like using a cell separation medium such as Ficoll. In recovering the nucleated cells, the nucleated cells may be left by hemolyzing red blood cells and the like using a hemolytic agent instead of recovering the nucleated cells by centrifugation. The target site of the recovered nucleated cells is labeled with at least one selected from the Fluorescence In Situ Hybridization (FISH) method, immunostaining method, intracellular organelle staining method and the like described below, and preferably by performing fluorescent labeling; then the suspension liquid of the labeled cells is used as a sample supplied to, for example, in an imaging flow cytometer to image the analysis target cells.

The sample can include multiple cells. Although the number of cells contained in the sample is not particularly limited, the sample should contain at least $10^2$ or more, preferably $10^3$ or more, more preferably $10^4$ or more, more preferably $10^5$ or more, and still even more preferably $10^6$ or more. Also, the plurality of cells may include different types of cells.

In the present embodiment, cells that can be analyzed are also referred to as analysis target cells. The analysis target cell may be a cell contained in a sample collected from a subject. Preferably, the cells may be nucleated cells. The cells can include normal cells and abnormal cells.

Normal cell means a cell that should be originally contained in the sample depending on the body portion where the sample is collected. Abnormal cell mean cells other than normal cells. Abnormal cells can include cells with chromosomal abnormalities and/or tumor cells. Here, the tumor cells are preferably peripheral circulating tumor cells. More preferably, the peripheral circulating tumor cells are not intended to be hematopoietic tumor cells in which tumor cells are present in the blood in a normal pathological state, rather tumor cells originating from a cell lineage other than a hematopoietic cell line are intended to be in circulation. In the present specification, tumor cells circulating peripherally are also referred to as circulating tumor cells (CTC).

When detecting a chromosomal abnormality, the target site is the nucleus of the cell to be analyzed. Examples of chromosomal abnormalities include chromosomal translocations, deletions, inversions, duplications, and the like. Examples of cells having such chromosomal abnormalities include myelodysplastic syndrome, acute myeloblastic leukemia, acute myeloblastic leukemia, acute promyelocytic leukemia, acute myelomonocytic leukemia, and acute monocytic leukemia, erythroleukemia, acute megakaryoblastic leukemia, acute myelogenous leukemia, acute lymphocytic leukemia, lymphoblastic leukemia, chronic myelogenous leukemia, chronic leukemia such as leukemia, Hodgkin lymphoma, non-Hodgkin lymphoma, malignant lymphoma and multiple myeloma.

Chromosomal abnormalities can be detected by known methods such as the FISH method. In general, test items for detecting chromosomal abnormalities are set according to the type of abnormal cells to be detected. The gene or locus to be analyzed is set as an analysis item depending on what kind of test item is to be performed on the sample. In the detection of chromosomal abnormalities by the FISH method, abnormal chromosome position or abnormal number can be detected by hybridizing a probe that specifically binds to the locus or gene present in the nucleus of the cell to be analyzed. The probe is labeled with a labeling substance. The labeling substance is preferably a fluorescent dye. Depending on the probe, when the labeling substance is a fluorescent dye, the labeling substance combines with fluorescent dyes having different fluorescence wavelength regions, and it is possible to detect multiple genes or loci in one cell.

The abnormal cell is a cell that appears when suffering from a predetermined disease, and may include, for example, a tumor cell such as a cancer cell or a leukemia cell. In the case of hematopoietic organs, the predetermined diseases can be selected from a group consisting of myeloid dysplasia syndrome, acute myeloid leukemia, acute myeloid leukemia, acute premyelocytic leukemia, acute myeloid monocytic leukemia, acute monocytic leukemia, leukemia such as red leukemia, acute meganuclear blast leukemia, acute myeloid leukemia, acute lymphocytic leukemia, lymphoblastic leukemia, chronic myeloid leukemia, or chronic lymphocytic leukemia, Hodgkin lymphoma, non-Hodgkin lymphoma, malignant lymphoma and multiple myeloid leukemia. In the case of organs other than hematopoietic organs, the predetermined diseases may be gastrointestinal malignant tumors originating from the rectum or anal region, upper pharynx, esophagus, stomach, duodenum, jejunum, ileum, cecum, worm, ascending colon, transverse colon, descending colon, S-shaped colon; liver cancer; cholangiocarcinoma; pancreatic cancer; pancreatic cancer; urinary malignancies originating from the bladder, ureter or kidney; female reproductive system malignancies originating from the ovaries, Fallopian tubes, uterus; breast cancer; pre-stage cancer; skin cancer; endocrine malignancies such as the hypothalamus, pituitary gland, thyroid gland, parathyroid gland, adrenal gland, and pancreas; central nervous system malignancies; and solid tumors such as a malignant tumor that develops from bone and soft tissue.

Abnormal cells can be detected using at least one selected from bright-field images, immunostaining images for various antigens, and organelle-stained images that specifically stain organelles.

A bright-field image can be obtained by irradiating a cell with light and imaging the transmitted light from the cell or the reflected light from the cell. Preferably, the bright-field image is an image obtained by capturing the phase difference of cells using transmitted light.

Immunostained images can be obtained by imaging immunostained cells by labeling with a labeling substance using an antibody capable of binding to an antigen present at at least one intracellular or cell target site selected from the nucleus, cytoplasm, and cell surface. As the labeling substance, it is preferable to use a fluorescent dye as in the FISH method. Depending on the antigen, when the labeling substance is a fluorescent dye, the labeling substance combines with fluorescent dyes having different fluorescence wavelength regions, and it is possible to detect multiple antigens in one cell.

Organelle-stained images can be obtained by imaging stained cells using dyes that can selectively bind to proteins, sugar chains, lipids, nucleic acids and the like present in at least one cell or cell membrane target site selected from the nucleus, cytoplasm, and cell membrane. Examples of nuclear-specific stains include Hoechst™ 33342, Hoechst™ 33258, 4', 6-diamidino-2-phenylindole (DAPI), Propidium Iodide (PI), DNA-binding dyes such as ReadyProbes™ nuclear staining reagents, and Histone protein binding reagents such as Cell Light™ reagent. Examples of the nucleolus and RNA-specific staining reagent include SYTO™ RNA Select™, which specifically binds to RNA. Examples of the cytoskeleton-specific staining reagent include fluorescently labeled phalloidin. The CytoPainter series from Abcam plc (Cambridge, UK) can be used as dye to stain other organelles, such as lysosomes, endoplasmic reticulum, Golgi apparatus, mitochondria and the like. These staining dyes or staining reagents are fluorescent dyes or reagents containing fluorescent dyes, and different fluorescence wavelength regions can be selected depending on the wavelength range of the fluorescence of the organelles and the fluorescent dyes used as another stain applied jointly to one cell.

When detecting abnormal cells, inspection items are set according to what kind of abnormal cells are detected. The inspection items may include analysis items necessary for detecting abnormal cells. The analysis items may be set corresponding to the above-mentioned bright-field image, each antigen, and each organelle. Fluorescent dyes having different wavelength regions of fluorescence correspond to each analysis item except for the bright field, and different analysis items can be detected in one cell.

The analysis data to be input to the artificial intelligence algorithm is acquired by a method described later. The data indicating the properties of the cells included in the analysis target image generated by the artificial intelligence algorithm are, for example, data indicating whether the analysis target cells are normal or abnormal. More specifically, the data indicating the properties of the cells included in the analysis target image are data indicating whether the analysis target cell is a cell having a chromosomal abnormality or a peripheral circulating tumor cell.

For convenience of description in the present specification, "analysis target image" may be referred to as "analysis image", "data to be analyzed" may be referred to as "analysis data", "image for training" may be referred to as "training image", and "data for training" may be referred to as "training data". The "fluorescent image" is intended to be a training image obtained by imaging a fluorescent label or an analysis image obtained by imaging a fluorescent label.

2. Cell Analysis Method Using a First Artificial Intelligence Algorithm

The training method of the first artificial intelligence algorithm 50 and the second artificial intelligence algorithm 53, and the cell analysis method using the trained first artificial intelligence algorithm 60 and the trained second artificial intelligence algorithm 63 will be described using FIGS. 2A, 2B to 12. The first and second artificial intelligence algorithms 60 and 63 can be deep learning algorithms having a neural network structure. The neural network structure can be selected from a fully connected deep neural network (FC-DNN), a convolutional neural network (CNN), an autoregressive neural network (RNN), and a combination thereof. A convolutional neural network is preferred.

As the artificial intelligence algorithm, for example, the artificial intelligence algorithm provided by Python can be used.

2-1. Artificial Intelligence Algorithm for Detecting Chromosomal Abnormality

This embodiment is related to a training method using a first artificial intelligence algorithm 50 for detecting a chromosomal abnormality, and a cell analysis method using the trained first artificial intelligence algorithm 60 for detecting a chromosomal abnormality. Here, the term "train" or "training" may be used in place of the term "generate" or "generating".

(1) Training Data Generation

A training method of the first artificial intelligence algorithm 50 for detecting a chromosomal abnormality will be described with reference to FIGS. 2A, 2B and 3. In FIGS. 2A and 2B, an example using an image of FISH staining of the PML-RARA chimeric gene formed by translocation of a transcriptional regulator lodged on the long arm of chromosome 15 (15q24.1), and the retinoic acid receptor α (RARA) gene located on the long arm of chromosome 17 (17q21.2).

As shown in FIGS. 2A and 2B, labeled positive integrated training data 73P and labeled negative integrated training data 73N are generated from a positive training image 70P obtained by imaging a cell positive for a chromosomal abnormality (hereinafter referred to as "first positive control cell") and a negative training image 70N obtained by imaging a cell negative for chromosomal abnormality (hereinafter referred to as "first negative control cell"), respectively. The positive training image 70P and the negative training image 70N may be collectively referred to as a training images 70. Further, the labeled positive integrated training data 73P and the labeled negative integrated training data 73N may be collectively referred to as training data 73.

Here, the case of detecting the PML-RARA chimeric gene will be exemplified. The example shows a probe for detecting the PML locus is bound to a first fluorescent dye that fluoresces in the green wavelength region, and a probe for detecting the RARA locus is bound to a second fluorescent dye that fluoresces in the red wavelength region different from that of the first fluorescent dye. The nucleus of the first positive control cell and the nucleus of the first negative control cell can be labeled with the first fluorescent dye and the second fluorescent dye, respectively, by the FISH method using the probe bound with the first fluorescent dye and the probe bound with the second fluorescent dye. The label with the first fluorescent dye at the target site may be referred to as the first fluorescent label, and the label with the second fluorescent dye at the target site may be referred to as the second fluorescent label.

A sample containing cells having the first fluorescent label and the second fluorescent label can be subjected to analysis in a cell imaging device such as an imaging flow cytometer to capture an image of the cells. An image taken of a cell may include multiple images for the same field of view of the same cell. Since the first fluorescent label and the second fluorescent label have different fluorescence wavelength regions of the respective fluorescent dyes, a first filter for transmitting light emitted from the first fluorescent dye and a second filter for transmitting the light emitted from the second fluorescent dye differ. Therefore, the light transmitted through the first filter and the light transmitted through the second filter are taken into the imaging unit 160 described later via a corresponding first channel and a second channel, respectively, to capture as separate images of the same cell in the same field of view. That is, in the imaging unit 160, a plurality of images corresponding to the number of labeling substances labeling the cell are acquired for the same field of view of the same cell.

Therefore, in the example of FIGS. 2A and 2B, as shown in FIG. 2A, the positive training image 70P includes a first positive training image 70PA in which a green first fluorescent label is imaged via a first channel and a second positive training image 70PB in which a red second fluorescent label is imaged via a second channel for the first positive control cell. The first positive training image 70PA and the second positive training image 70PB are associated with each other as images of the same field of view of the same cell. The first positive training image 70PA and the second positive training image 70PB are then converted to the first positive numerical training data 71PA and the second positive numerical training data 71PB, which numerically indicate the brightness of the captured light at each pixel in the image.

A method of generating the first positive numerical training data 71PA will be described using the first positive training image 70PA. Each image captured by the imaging unit 160 is trimmed to, for example, 100 pixels in length× 100 pixels in width to generate a training image 70. At this time, trimming is performed so that the images acquired from each channel for one cell have the same field of view. The first positive training image 70PA is represented, for example, as a 16-bit grayscale image. Therefore, in each pixel, the brightness of the pixel can be indicated by a numerical value of the brightness of 65,536 gradations from 1 to 65,536. As shown in FIG. 2A, the value indicating the gradation of brightness in each pixel of the first positive training image 70PA is the first positive numerical training data 71PA, which expresses a matrix of numbers corresponding to each pixel.

Similar to the first positive numerical training data 71PA, the second positive numerical training data 71PB indicating the brightness of the imaged light at each pixel in the image can be generated from the second positive training image 70PB.

Next, the first positive numerical training data 71PA and the second positive numerical training data 71PB are integrated for each pixel to generate positive integrated training data 72P. As shown in FIG. 2A, the positive integrated training data 72P are matrix data in which the numerical value in each pixel of the first positive numerical training data 71PA is shown side by side with the value in each pixel of the second positive numerical training data 71PB.

Next, the positive integrated training data 72P are labeled with a label value 74P indicating that the positive integrated training data 72P are derived from the first positive control cell, and the labeled positive integrated training data 73P are generated. The numeral "2" is attached in FIG. 2A as a label indicating that it is the first positive control cell.

From the negative training image 70N, the labeled negative integrated training data 73N are generated in the same manner as in the case of generating the labeled positive integrated training data 73P.

As shown in FIG. 2B, the negative training image 70N includes a first negative training image 70NA obtained by imaging a green first fluorescent label through a first channel and a second negative training image 70NB obtained by imaging a blue second fluorescent label through a second channel with regard to a first negative control cell. Imaging and trimming, and quantification of the brightness of light in each pixel are the same as in the case of acquiring the first positive numerical training data 71PA from the first positive training image 70PA. It is possible to generate the first negative numerical training data 71NA which numerically indicates the brightness of the captured light in each pixel in the image from the first negative training image 70N by the same method as the first positive numerical training data 71PA.

Similarly, from the second negative training image 70NB, it is possible to generate the second negative numerical training data 71NB that numerically indicates the brightness of the captured light at each pixel in the image.

As shown in FIG. 2B, the first negative numerical training data 71NA and the second negative numerical training data 71NB are integrated for each pixel according to the method of generating the positive integrated training data 72P, and the negative integrated training data 72N are generated. As shown in FIG. 2B, the negative integrated training data 72N become matrix data in which the numerical value in each pixel of the first negative numerical training data 71NA is shown side by side with the value in each pixel of the second negative numerical training data 71NB.

Next, the negative integrated training data 72N is labeled with a label value 74N indicating that the negative integrated training data 72N is derived from the first negative control cell, and labeled negative integrated training data 73N are generated. A "1" is attached in FIG. 2B as a label indicating that it is the first negative control cell.

Figure 3:
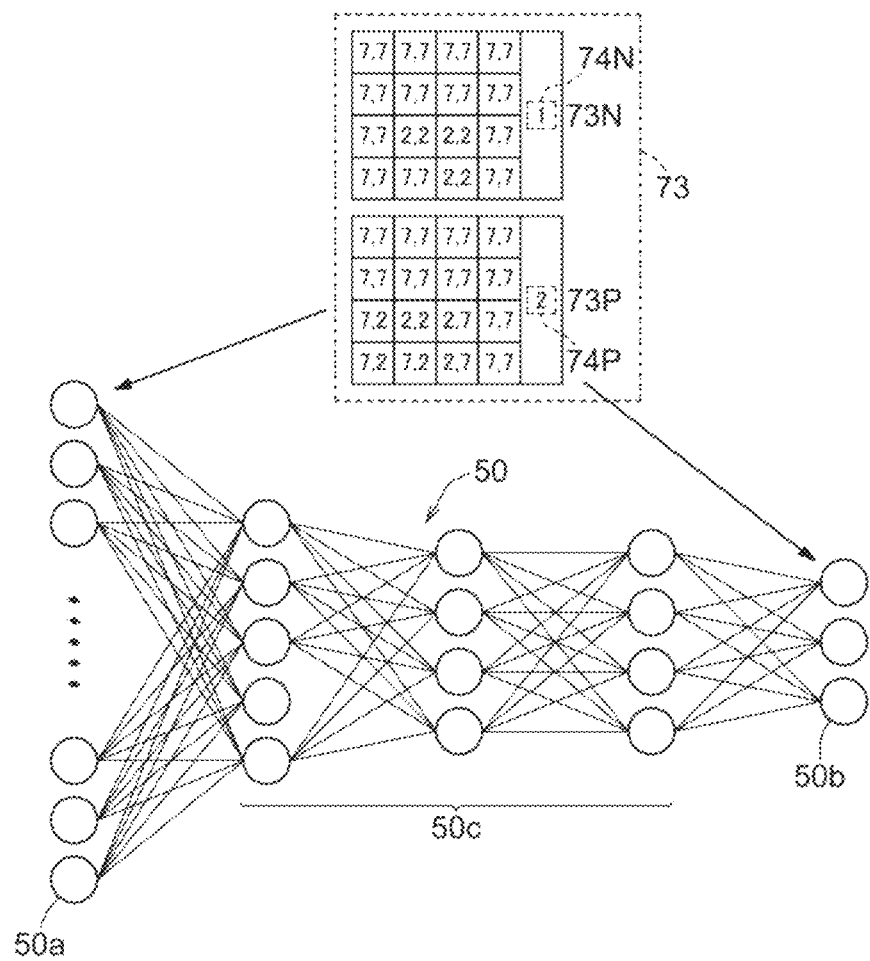
FIG. 3 shows a method of generating training data for training a first artificial intelligence algorithm 50 for analyzing chromosomal abnormalities.

FIG. 3 shows a method of inputting the labeled positive integrated training data 73P and the labeled negative integrated training data 73N generated in the first artificial intelligence algorithm 50. The number of nodes in the input layer 50a in the first artificial intelligence algorithm 50 having a neural network structure corresponds to the product of the number of pixels of the training image 70 (100× 100=10,000 in the above example) and the number of channels for one cell (two channels of a green channel and a red channel in the above example). Data corresponding to the positive integrated training data 72P of the labeled positive integrated training data 73P are input to the input layer 50a of the neural network. A label value 74P corresponding to the data input to the input layer 50a is input to the output layer 50b of the neural network. Further, data corresponding to the negative integrated training data 72N of the labeled negative integrated training data 73N are input to the input layer 50a of the neural network. A label value 74N corresponding to the data input to the input layer 50a is input to the output layer 50b of the neural network. With these inputs, each weight in the intermediate layer 50c of the neural network is calculated, the first artificial intelligence algorithm 50 is trained, and the trained first artificial intelligence algorithm 60 is generated.

(2) Analysis Data Generation and Cell Analysis

The method of generating the integrated analysis data 72 and the cell analysis method using the trained first artificial intelligence algorithm 63 will be described from the analysis image 80 with reference to FIG. 4. The analysis image 80 can be imaged in the same manner as the method in which the training image 70 is imaged.

As shown in FIG. 4, the analysis image 80 includes a first analysis image 80A in which a green first fluorescent label is imaged via a first channel and a second analysis image 80B in which a red second fluorescent label is imaged via a second channel for the cells to be analyzed. Imaging and trimming, and quantification of the brightness of light in each pixel are the same as in the case of acquiring the first positive numerical training data 71PA from the first positive training image 70PA. Using the same method as the first positive numerical training data 71PA, the first numerical analysis data 81A which numerically indicate the brightness of the captured light at each pixel in the image can be generated from the first analysis image 80A.

Similarly, from the second analysis image 80B, it is possible to generate the second numerical analysis data 81B which numerically indicates the brightness of the captured light in each pixel in the image.

As shown in FIG. 4, the first numerical analysis data 81A and the second numerical analysis data 81B are integrated for each pixel to generate the integrated analysis data 82 according to the method of generating the positive integrated training data 72P. As shown in FIG. 4, the integrated analysis data 82 become matrix data in which the numerical value in each pixel of the first numerical analysis data 81A is shown side by side with the value in each corresponding pixel of the second numerical analysis data 81B.

As shown in FIG. 4, the generated integrated analysis data 82 are input to the input layer 60a of the neural network in the trained first artificial intelligence algorithm 60. The value included in the input integrated analysis data 82 outputs a label value 84 indicating whether the analysis target cell has a chromosomal abnormality from the output layer 60b of the neural network via the intermediate layer 60c of the neural network. In the example shown in FIG. 4, when it is determined that the cell to be analyzed does not have a chromosomal abnormality, "1" is output as a label value, and when it is determined that the cell has a chromosomal abnormality, "2" is output as a label value. Instead of the label value, labels such as "none", "yes", "normal", and "abnormal" also may be output.

Figure 5A:
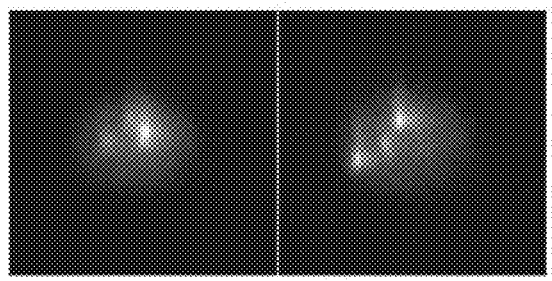
FIGS. 5A and 5B show a staining pattern of PML-RARA chimeric gene-positive cells by an imaging flow cytometer; The left side of FIG. 5A shows the image of channel 2, and the right side shows the image of channels 2.
Figure 5B:
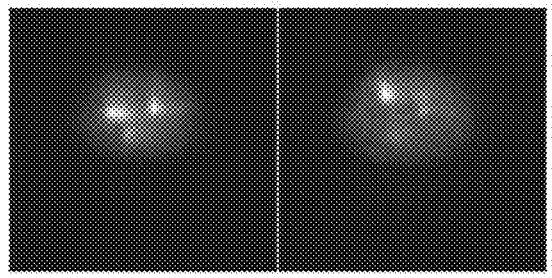

(3) Other Configurations i. In the present embodiment, the imaging flow cytometer uses an Extended Depth of Field (EDF) filter for expanding the depth of field when imaging cells, such that the cell image provided to the examiner restores the focal depth of the image after imaging. However, the training image 70 and the analysis image 80 used in the present embodiment are preferably images that have not been restored with respect to the images captured by using the EDF filter. An example of an image that has not been restored is shown in FIGS. 5A and 5B. FIGS. 5A and 5B show cells positive for the PML-RARA chimeric gene. A and B are images of different cells. The images on the left side of FIGS. 5A and 5B show images of the first fluorescent label. The images on the right side of FIGS. 5A and 5B show images of the same cells as the cells on the left side, and the image of the second fluorescent label imaged in the same field of view as the image on the left side.

ii. Out-of-focus images can be excluded from the training image 70 and the analysis image 80 during imaging. Whether the image is in focus can be determined because if the difference in brightness between each pixel and the adjacent pixel does not include a portion where the gradient of the difference changes drastically in the entire image, it can be determined that the image is out of focus.

iii. The training image 70 and the analysis image 80 used in the present embodiment are typically trimmed so that the number of pixels is 100 pixels in the vertical direction and 100 pixels in the horizontal direction, but the size of the image is not limited to this. The number of pixels can be appropriately set between 50 to 500 pixels in the vertical direction and 50 to 500 pixels in the horizontal direction. The number of pixels in the vertical direction and the number of pixels in the horizontal direction of the image do not necessarily have to be the same. However, a training image 70 for training the first artificial intelligence algorithm 50 and an analysis image 80 for generating integrated analysis data 82 to be input in the first artificial intelligence algorithm 60 trained using the training image 70 have the same number of pixels and preferably the same number of pixels in the vertical direction and the horizontal direction.

iv. In this embodiment, the training image 70 and the analysis image 80 use a 16-bit grayscale image. However, the gradation of brightness may be 8 bits, 32 bits, or the like in addition to 16 bits. Although, the numerical value for brightness expressed in 16 bits (65, 536 gradations) is used directly in the present embodiment, these numerical values also may be subjected to a low-dimensional processing for summarizing them with gradations having a constant width, and these low-dimensional numerical values may be used as the numerical training data 71PA, 71PB, 71NA, 71NB. In this case, it is preferable to perform the same processing on the training image 70 and the analysis image 80.

v. The chromosomal abnormalities that can be detected in this embodiment are not limited to the PML-RARA chimeric gene. For example, BCR/ABL fusion gene, AML1/ETO (MTG8) fusion gene (t (8; 21)), PML/RARα fusion gene (t (15; 17)), AML1 (21q22) translocation, MLL (11q23) translocation, TEL (12p13) translocation, TEL/AML1 fusion gene (t (12; 21)), IgH (14q32) translocation, CCND1 (BCL1)/IgH fusion gene (t (11; 14)), BCL2 (18q21) translocation, IgH/MAF fusion gene (t (14; 16)), IgH/BCL2 fusion gene (t (14; 18)), c-myc/IgH fusion gene (t (8; 14)), FGFR3/IgH fusion gene (t (4; 14)), BCL6 (3q27) translocation, c-myc (8q24) translocation, MALT1 (18q21) translocation, API2/MALT1 fusion gene (t (11; 18) translocation), TCF3/PBX1 fusion gene (t (1; 19) translocation), EWSR1 (22q12) translocation, PDGFRI3 (5q32) translocation, IGH-CCND1 gene [(IGH-BCL1) (t (11; 14) translocation) (chromosomal)], IGH-FGFR3 gene (t (4; 14) translocation), IgH-MAF gene (t (14; 16) translocation) and the like can be detected.

Figure 6:
FIG. 6 shows an example of a fluorescent labeling pattern.

Also, translocations can include various variations. FIGS. 6 and 7 show examples of fluorescent labeling of a typical positive pattern (major pattern) of the BCR/ABL fusion gene. In the state in which the first fluorescent label image and the second fluorescent label image are superimposed and the ES probe is used, negative cases have two first fluorescent labels and two second fluorescent labels, and the number of fusion fluorescent labeled images is zero. In the typical positive pattern using the ES probe, the number of the first fluorescent labels is 1, the number of the second fluorescent labels is 2, and the number of fusion fluorescent labels is 1. When the DF probe is used and the first fluorescent label image and the second fluorescent label image are superimposed, the negative pattern has two first fluorescent labels and two second fluorescent labels, and the number of fusion fluorescent labels is zero. In the typical positive pattern example using the DF probe, the number of the first fluorescent labels is 1, the number of the second fluorescent labels is 1, and the number of fusion fluorescent labels is 2.

FIG. 7 is an example of a fluorescent labeling of an atypical positive pattern of the BCR/ABL fusion gene. One example of the atypical positive pattern is the minor BCR/ABL pattern, in which the cut point of the BCR gene is relatively upstream of the BCR gene, so that the ES probe also detects three first fluorescent labels. Another example of the atypical positive pattern is the deletion of a portion of the binding region of the probe targeting the ABL gene on chromosome 9, and dependent on this, only one fusion fluorescent label is detected whereas two should be detected when the DF probe is used. In another example of the atypical positive pattern, a portion of the binding region of the probe targeting the ABL gene on chromosome 9 and a portion of the binding region of the probe targeting the BCR gene on chromosome 22 are both deleted. Dependent on this, only one fusion fluorescent label is detected whereas two should be detected when the DF probe is used.

FIG. 8 shows an example of a negative pattern and a reference pattern of a positive pattern when detecting a chromosomal abnormality related to the ALK locus is detected. In the negative pattern, the ALK gene is not cleaved, so there are two fusion fluorescent labels. On the other hand, in the positive pattern, since the ALK gene is cleaved, only one fusion fluorescent label is present (when only one of the alleles is cleaved), or the fusion fluorescent label is not recognized (both alleles). If is disconnected). The negative pattern and the positive pattern are the same for the ROS1 gene and the RET gene as well as the ALK gene.

FIG. 8 shows an example of a reference pattern of a chromosomal abnormality in which the long arm (5q) of chromosome 5 is deleted. For example, the first fluorescently labeled probe is designed to bind to the long arm of chromosome 5, and the second fluorescently labeled probe is designed to bind to the centromere of chromosome 5. In the negative pattern, the number of centromeres on chromosome 5 and the number of long arms on chromosome 5 are the same, so the first fluorescent label and the second fluorescent label reflect the number of homologous chromosomes, that is, two each. In the positive pattern, deletion of the long arm occurs on one or both of chromosome 5, and the number of the first fluorescent labels is only 1 or 0. This negative and positive pattern is the same for deletions of the short or long arms of other chromosomes. Examples of long-arm deletions of other chromosomes include long-arm deletions of chromosomes 7 and 20. Further examples showing similar positive and negative patterns include 7q31 (deletion), p16 (9p21 deletion analysis), IRF-1 (5q31) deletion, D20S108 (20q12) deletion, D13S319 (13q14) deletion, 4q12 deletion, ATM (11q22.3) deletion, p53 (17p13.1) deletion and the like.

FIG. 8 also shows an example of chromosome 8 trisomy. The first fluorescently labeled probe binds, for example, to the centromere on chromosome 8. The positive pattern has three first fluorescent labels. The negative pattern has two first fluorescent labels. Such a fluorescent labeling pattern is the same in trisomy 12 of chromosome. In the chromosome 7 monosomy, for example, when a first fluorescently labeled probe that binds to the centromere of chromosome 7 is used, the positive pattern is one first fluorescent label. The negative pattern has two first fluorescent labels.

2-2. Artificial Intelligence Algorithm for Detecting Peripheral Circulating Tumor Cells The present embodiment relates to a method for training a second artificial intelligence algorithm 53 for detecting peripheral circulating tumor cells and a method for analyzing cells using the second artificial intelligence algorithm 63 for detecting peripheral circulating tumor cells. Here, the term "train" or "training" may be used in place of the term "generate" or "generating".

(1) Training Data Generation

The training method of the second artificial intelligence algorithm 53 for detecting peripheral circulating tumor cells will be described with reference to FIG. 9A(a), FIG. 9A(b), FIG. 9A(c), FIG. 9A(d), FIG. 9B(a), FIG. 9B(b), FIG. 9B(c), and FIG. 9B(d) to 11.

FIG. 9A(a), FIG. 9A(b), FIG. 9A(c), FIG. 9A(d), FIG. 9B(a), FIG. 9B(b), FIG. 9B(c), and FIG. 9B(d) show a preprocessing method for an image captured by the imaging unit 160. FIG. 9A(a), FIG. 9A(b), FIG. 9A(c), and FIG. 9A(d) show a captured image before pretreatment. The preprocessing is a trimming process for making the training image 75 and the analysis image 85 the same size, and can be performed on all the images used as the training image 75 or the analysis image 85. FIG. 9A(a) and FIG. 9A(b) are images of the same cell, but the channels at the time of imaging are different. FIG. 9A(c) and FIG. 9A(a) are images of different cells. Although FIG. 9A(c) and FIG. 9A(d) are images of the same cell, the channels when imaging are different. As shown in FIG. 9A(a) and FIG. 9A(c), the size of the image when the cells are imaged may be different. In addition, the size of the cell itself also may differ depending on the cell. Therefore, it is preferable to trim the acquired image so as to reflect the size of the cells and have the same image size. In the example shown in FIG. 9A(a), FIG. 9A(b), FIG. 9A(c), FIG. 9A(d), FIG. 9B(a), FIG. 9B(b), FIG. 9B(c), and FIG. 9B(d), a position separated by 16 pixels in the vertical direction and the horizontal direction from the center is set as a trimming position with the center of gravity of the nucleus of the cell in the image as the center. The image cut out for trimming is shown in FIG. 9B(a), FIG. 9B(b), FIG. 9B(c), and FIG. 9B(d). FIG. 9B(a) is an image extracted from FIG. 9A(a), FIG. 9B (b) is an image extracted from FIG. 9A(b), FIG. 9B(c) is an image extracted from FIG. 9A(c), and FIG. 9B (d) is an image extracted from FIG. 9A(d). Each image in FIG. 9B(a), FIG. 9B(b), FIG. 9B(c), and FIG. 9B(d) has a length of 32 pixels and a width of 32 pixels. The center of gravity of the nucleus can be determined, for example, by using the analysis software (IDEAS) attached to an imaging flow cytometer (ImageStream MarkII, Luminex).

Figures 10A, 10B:
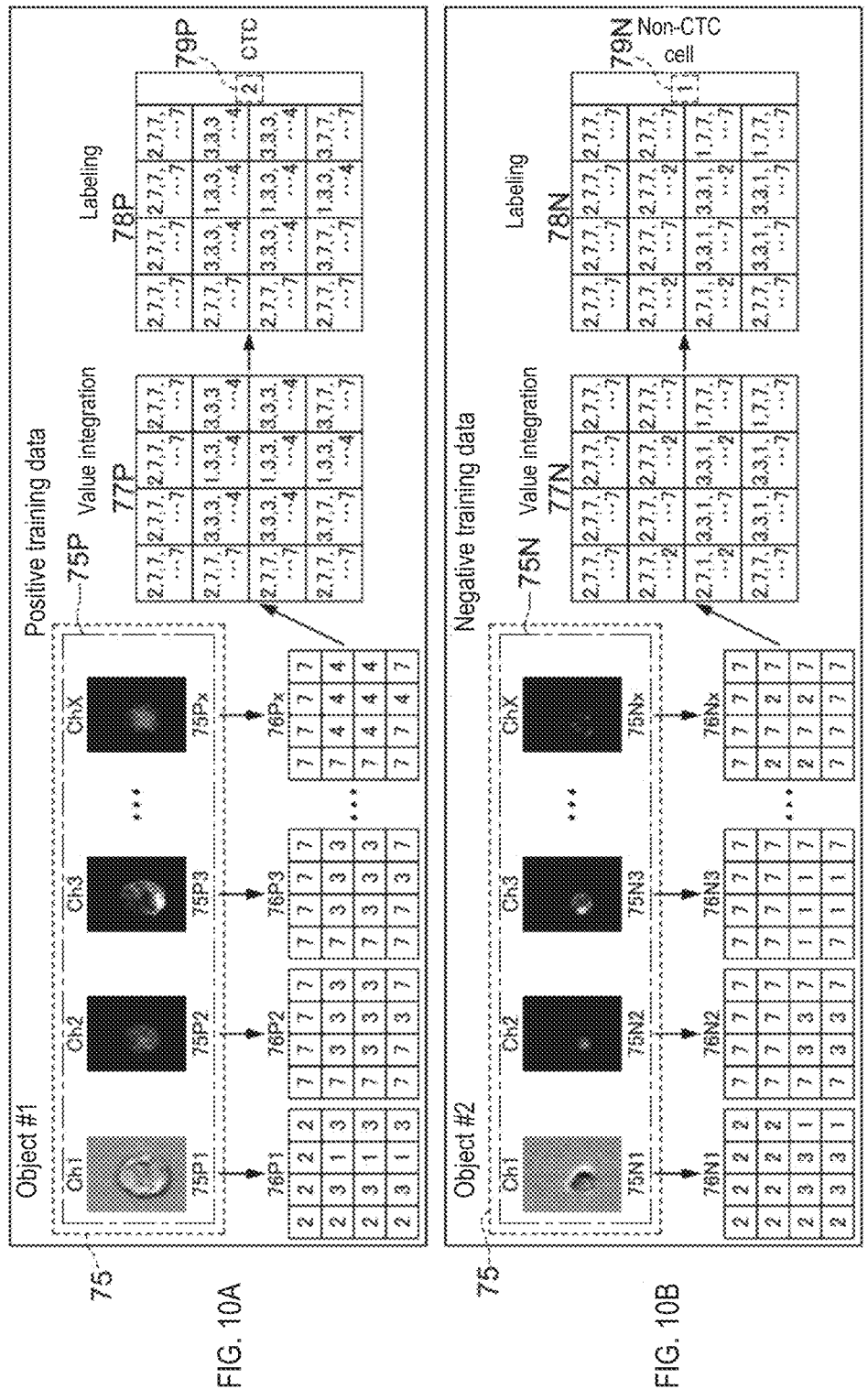
FIGS. 10A and 10B shows a method of generating training data for training a second artificial intelligence algorithm 53 for analyzing peripheral circulating tumor cells.
Figure 11:
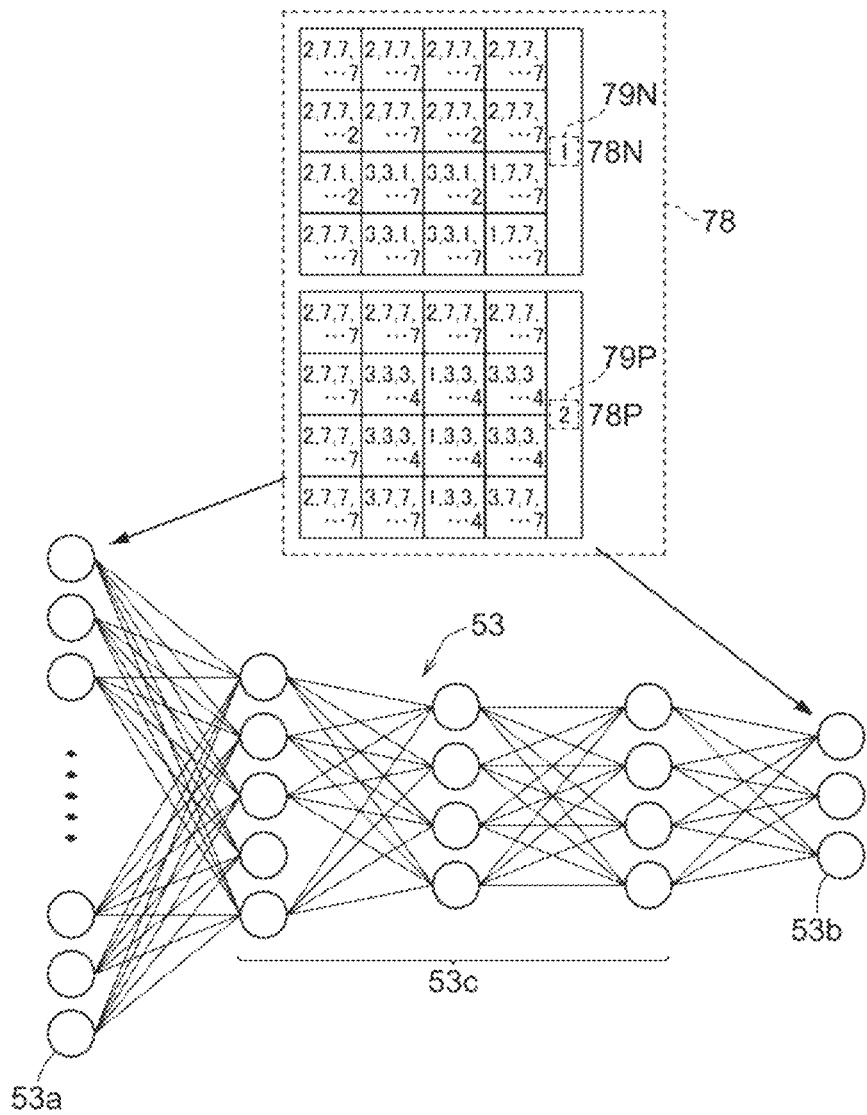
FIG. 11 shows a method of generating training data for training a second artificial intelligence algorithm 53 for analyzing peripheral circulating tumor cells.

FIGS. 10A, 10B and 11 show a training method for the second artificial intelligence algorithm 53.

As shown in FIGS. 10A and 10B, positive integrated training data 78P and the negative integrated training data 78N are generated from a positive training image 75P obtained by imaging peripheral circulating tumor cells (hereinafter, referred to as "second positive control cell") and negative training image 75N obtained from cells other than peripheral circulating tumor (hereinafter, "second negative control cell"). The positive training image 75P and the negative training image 75N may be collectively referred to as a training image 75. The positive integrated training data 78P and the negative integrated training data 78N also may be collectively referred to as training data 78.

When detecting peripheral circulating tumor cells, the image captured by the imaging unit 160 may include a bright field image and a fluorescence image. The brightfield image can be an image of the phase difference of the cells. This image can be captured, for example, on a first channel. The fluorescent image is an image of a fluorescent label labeled at a target site in the cell by immunostaining or intracellular organelle staining. Fluorescent labeling is performed with fluorescent dyes that have different fluorescence wavelength regions for each antigen and/or each organelle.

For example, when the first fluorescent dye that emits fluorescence in the first green wavelength region is bound to the first antigen, the first antigen can be labeled with the first fluorescent dye by binding the first fluorescent dye to an antibody that directly or indirectly binds to the first antigen. When a second fluorescent dye that emits fluorescence in a red wavelength region different from that of the first fluorescent dye is bound to an antibody that binds to the second antigen, the second antigen can be labeled with the second fluorescent dye by binding the second fluorescent dye to an antibody that directly or indirectly binds to the second antigen.

When the antibody that binds to the third antigen is bound to the first fluorescent dye and the third fluorescent dye that emits fluorescence in a yellow wavelength region different from that of the second fluorescent dye, the third antigen can be labeled with a third fluorescent dye by binding the third fluorescent dye to an antibody that directly or indirectly binds to the third antigen.

In this way, fluorescent dyes with different fluorescence wavelength regions can be labeled from the first fluorescence label to the Xth fluorescence label.

A sample containing cells having the first fluorescent label to the Xth fluorescent label can be subjected to imaging with a cell imaging device such as an imaging flow cytometer, and an image of the cells can be obtained. An image taken of a cell may include multiple images for the same field of view of the same cell. Since the first fluorescent label to the Xth fluorescent label have different fluorescence wavelength regions of each fluorescent dye, the filter for transmitting the light emitted from each fluorescent dye is different for each fluorescent dye. The bright field image requires the use of a filter different from the filter that transmits light from the fluorescent dye. Therefore, the light transmitted through each filter is taken into the imaging unit 160 (described later) via each corresponding channel, and is captured as another image of the same cell in the same field of view. That is, in the imaging unit 160, for the same visual field of the same cell, a plurality of images corresponding to the number obtained by adding the number of bright-field images to the number of labeling substances labeling the cells are acquired.

In the example shown in FIGS. 10A and 10B, the first channel (Ch1) indicates a bright-field image in FIGS. 10A and 10B. In FIGS. 10A and 10B, the second channel (Ch2), the third channel (Ch3), . . . the Xth channel (ChX) refer to each channel in which a plurality of different labeling substances are imaged.

In the example of FIGS. 10A and 10B, as shown in FIG. 10A, the positive training image 75P includes the first positive training image 75P1 imaged through the first channel of the second positive control cell, a second positive training image 75P2 in which the first fluorescent label is imaged via the second channel, a third positive training image 75P3 in which the second fluorescent label is imaged via the third channel, and the like on up to an Xth positive training image 75Px in which each fluorescent label is imaged on up to the Xth channel. Images from the first positive training image 75P1 to the Xth positive training image 75Px are associated as images of the same visual field of the same cell. Images from the first positive training image 75P1 to the Xth positive training image 75P are converted to the first positive numerical training data 76P1 to the Xth positive training data 76Px which numerically indicate the brightness of the imaged light in each pixel in the image.

A method of generating the first positive numerical training data 76P1 will be described with reference to the first positive training image 75P1. Each image captured by the imaging unit 160 is trimmed, for example, to 32 pixels in length×32 pixels in width by the above-mentioned preprocessing to obtain a training image 75. The first positive training image 75P1 is represented, for example, as a 16-bit grayscale image. Therefore, in each pixel, the brightness of the pixel can be indicated by a numerical value of the brightness of 65,536 gradations from 1 to 65,536. As shown in FIG. 10A, the values indicating the gradation of brightness in each pixel of the first positive training image 75P1 are the first positive numerical training data 76P1, which is a matrix of numbers corresponding to each pixel.

Similar to the first positive numerical training data 76P1, the Xth positive numerical training data 76Px can be generated from the second positive numerical training data 76P2 which numerically indicate the brightness of the imaged light for each pixel in the image from the second positive training image 75P2 to the Xth positive training image 75Px.

Next, the first positive numerical training data 76P1 to the Xth positive numerical training data 76Px are integrated for each pixel to generate positive integrated training data 77P. As shown in FIG. 10A, in the positive integrated training data 77P become matrix data in which the numerical values in each pixel of the first positive numerical training data 76PA are shown side by side with the values of each pixel corresponding to the second positive numerical training data 76P2 to the X positive numerical training data 76Px.

Next, the positive integrated training data 77P is labeled with a label value 79P indicating that the positive integrated training data 77P is derived from the second positive control cell, then labeled positive integrated training data 78P are generated. The numeral "2" is attached in FIG. 10A as a label indicating that it is the first positive control cell.

From the negative training image 75N, the labeled negative integrated training data 78N are generated in the same manner as in the case of generating the labeled positive integrated training data 78P.

As shown in FIG. 10B, the negative training image 75N includes from the first negative training image 75N1 to the Xth negative training image 75Nx obtained from the first channel via the Xth image for the second negative control cell, similarly to the positive training image 75P. The quantification of the brightness of light in each pixel is identical to the case when the first positive numerical training data 76P1 to Xth positive numerical training data 76Px are acquired from the first positive training image 75PA to the Xth positive training image 75P. First negative numerical training data 76N1 indicating the brightness of the imaged light numerically can be generated for each pixel in the image from the first negative training image 75N1 by the same method as the first positive numerical training data 76P1.

Similarly, from the second negative numerical training data 76N2 to the Xth negative numerical training data 76Nx indicating the brightness of the imaged light numerically can be generated for each pixel in the image from the second negative training image 75N2 to the Xth second training image 75Nx.

As shown in FIG. 10B, the first negative numerical training data 76N1 to the Xth negative numerical training data 76Nx are integrated for each pixel according to the method of generating the positive integrated training data 77P to generate the negative integrated training data 77N. As shown in FIG. 10B, in the negative integrated training data 77N become matrix data in which the numerical values in each pixel the first negative numerical training data 76N1 are shown side by side with the values of each pixel corresponding to the second negative numerical training data 76N2 to the Xth negative numerical training data 76Nx.

Next, the negative integrated training data 77N is labeled with a label value 79N indicating that the negative integrated training data 77N is derived from the second negative control cell, and labeled negative integrated training data 78N are generated. A "1" is attached in FIG. 10B as a label indicating that it is the second negative control cell.

FIG. 11 shows a method of inputting the labeled positive integrated training data 78P generated in the second artificial intelligence algorithm 53 and the labeled negative integrated training data 78N. The number of nodes of the input layer 53a in the first artificial intelligence algorithm 53 having a neural network structure corresponds to the sum of the number of pixels of the training image 75 (32×32=1024 in the above example) and the number of channels for one cell (X channels from 1 to X in the above example). Data equivalent to the positive integrated training data 77P of the labeled positive integrated training data 78P are input to the input layer 53a of the neural network. A label value 79P corresponding to the data input to the input layer 53a is input to the output layer 53b of the neural network. Data corresponding to the negative integrated training data 77N of the labeled negative integrated training data 78N are input to the input layer 53a of the neural network. A label value 79N corresponding to the data input to the input layer 53a is input to the output layer 53b of the neural network. With these inputs, each weight in the intermediate layer 53c of the neural network is calculated, the second artificial intelligence algorithm 53 is trained, and the trained second artificial intelligence algorithm 63 is generated.

(2) Analysis Data Generation

The method of generating the integrated analysis data 72 and the cell analysis method using the trained first artificial intelligence algorithm 63 will be described from the analysis image 85 with reference to FIG. 12. The analysis image 85 can be captured and reprocessed in the same manner as the training image 75 was captured.

Figure 12:
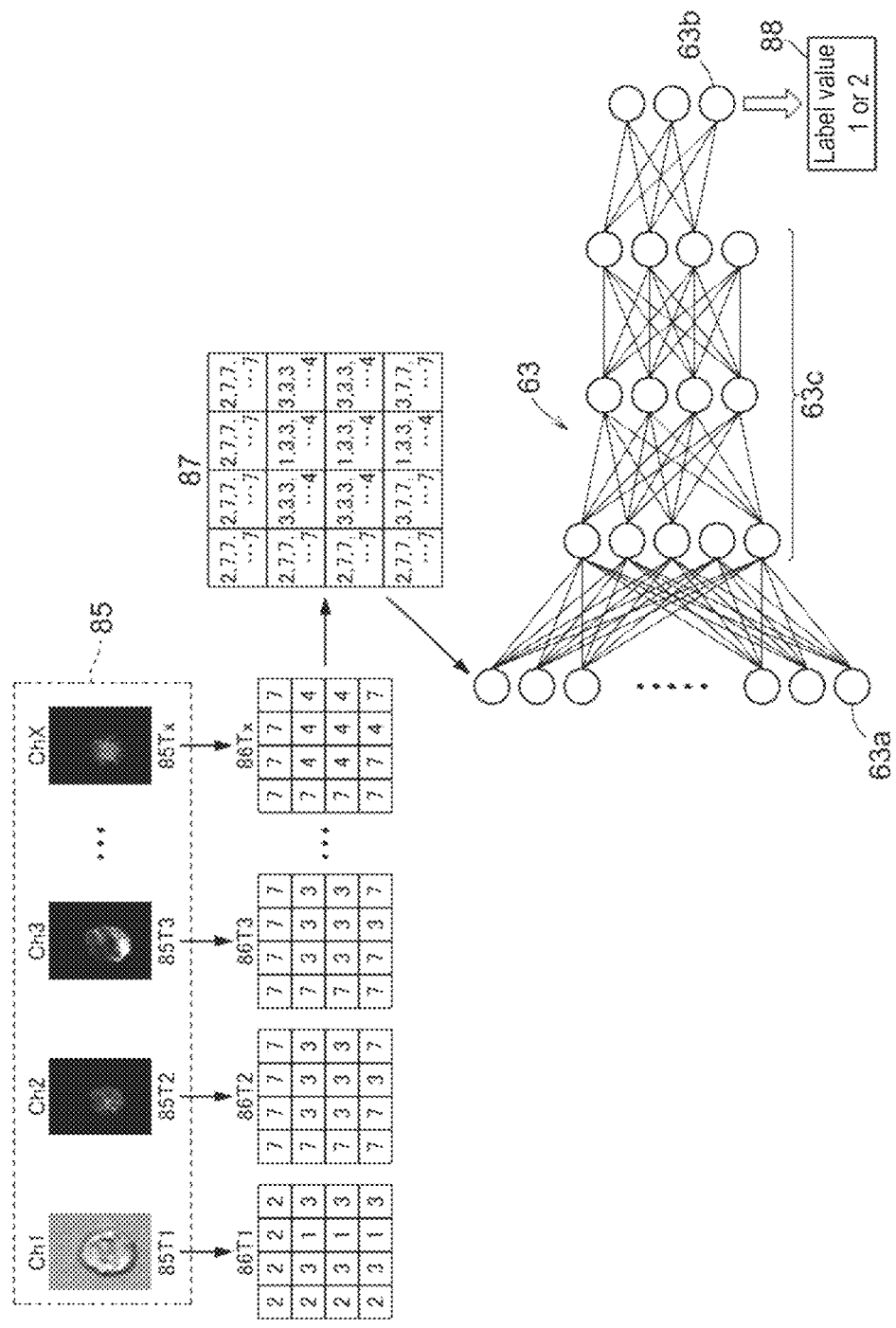
FIG. 12 shows a method of generating analysis data for analyzing peripheral circulating tumor cells, and a method of analyzing cells by a trained second artificial intelligence algorithm 63.

As shown in FIG. 12, the analysis image 85 includes a first analysis image 85T1, that is, a bright-field image of the cells to be analyzed taken through the first channel, and the Xth analysis image 85Tx obtained from the second analysis image 85T2 of the imaged Xth fluorescence label taken through the Xth channel from the second channel. Imaging and preprocessing, and quantification of the brightness of light in each pixel are the same as in the case of acquiring the first positive numerical training data 76P1 from the first positive training image 75P1. Using the same method as the first positive numerical training data 76P1, the first numerical analysis data 86T1 which numerically indicates the brightness of the captured light at each pixel in the image is generated from the first analysis image 85T1.

Similarly, from the second analysis image 85T2 to the Xth analysis image 85Tx, the Xth numerical analysis data 86Tx can be generated from the second numerical analysis data 86T2 numerically indicating the brightness of the captured light in each pixel in the image.

As shown in FIG. 12, the first numerical analysis data 86T1 to the Xth numerical analysis data 86Tx are integrated for each pixel to generate the integrated analysis data 87 according to the method of generating the positive integrated training data 77P. As shown in FIG. 12, the integrated analysis data 87 become matrix data in which the numerical value in each pixel of the first numerical analysis data 86T1 are shown side by side with the value in each pixel corresponding to the second numerical analysis data 86T2 to the Xth numerical analysis data 86Tx.

As shown in FIG. 12, the generated integrated analysis data 87 are input to the input layer 63a of the neural network in the trained second artificial intelligence algorithm 63. The value included in the input integrated analysis data 87 outputs a label value 89 indicating whether the analysis target cell is a peripheral circulating tumor cell from the output layer 63b of the neural network via the intermediate layer 63c of the neural network. In the example shown in FIG. 12, "1" is output as a label value when it is determined that the cell to be analyzed is not a peripheral circulating tumor cell, and "2" is output as a label value when it is determined to be a peripheral circulating tumor cell. Instead of the label value, labels such as "none", "yes", "normal", and "abnormal" also may be output.

(3) Other Configurations i. The training image 75 and the analysis image 85 used in the present embodiment are preferably images that have not been restored with respect to the images captured by using the EDF filter.

ii. Out-of-focus images can be excluded from the training image 75 and the analysis image 85 during imaging.

iii. Although the training image 75 and the analysis image 85 used in the present embodiment are typically trimmed so that the number of pixels is 32 pixels in the vertical direction and 32 pixels in the horizontal direction, the size of the image is not limited insofar as the entire cell is contained in the image. The number of pixels can be appropriately set between 30 to 50 pixels in the vertical direction and 30 to 50 pixels in the horizontal direction. The number of pixels in the vertical direction and the number of pixels in the horizontal direction of the image do not necessarily have to be the same. However, a training image 75 for training the first artificial intelligence algorithm 53 and an analysis image 85 for generating integrated analysis data 87 to be input to the first artificial intelligence algorithm 63 trained using the training image 75 preferably have the same number of pixels in the vertical direction and the horizontal direction.

iv. In this embodiment, the training image 70 and the analysis image 80 use a 16-bit grayscale image. However, the gradation of brightness may be 8 bits, 32 bits, or the like in addition to 16 bits. Although, for each numerical training data 76P1 to numerical training data 76Px and numerical training data 76N1 to numerical training data 76Nx, the numerical values of the brightness represented by 16 bits (65,536 gradations) are used directly in the present embodiment, these numerical values are subjected to a low-dimensional processing that summarizes them with a gradation of a certain width, and the numerical values after the low dimensional processing also may be used as the numerical training data 76Px from each numerical training data 76P1 and the numerical training data 76Nx from the numerical training data 76N1. In this case, it is preferable to perform the same processing on the training image 70 and the analysis image 80.

3. Cell Analysis System

Hereinafter, the cell analysis systems 1000, 2000, and 3000 according to the first to third embodiments will be described with reference to FIGS. 13 to 21.

3-1. First Embodiment of a Cell Analysis System

Figure 13:
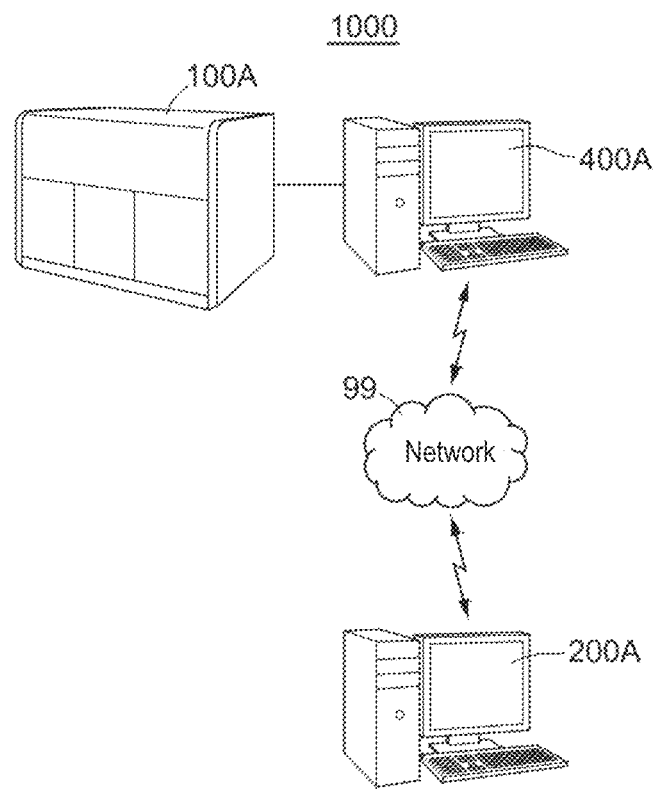
FIG. 13 shows the hardware structure of the cell analysis system 1000.

FIG. 13 shows the hardware structure of the cell analysis system 1000 according to the first embodiment. The cell analysis system 1000 may include a training device 200A for training the artificial intelligence algorithm, a cell imaging device 100A, and a cell analysis device 400A. The cell imaging device 100A and the cell analysis device 400A are communicably connected. The training device 200A and the cell analysis device 400A also can be connected by a wired or wireless network.

3-1-1. Training Device

(1) Hardware Structure

Figure 14:
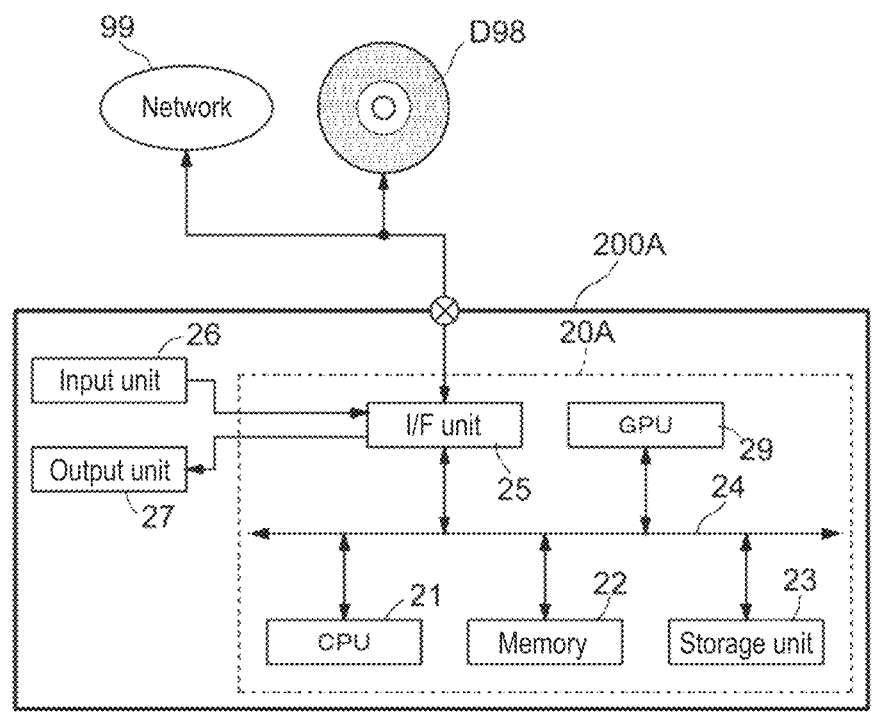
FIG. 14 shows the hardware structure of the training device 200A.
Figure 15:
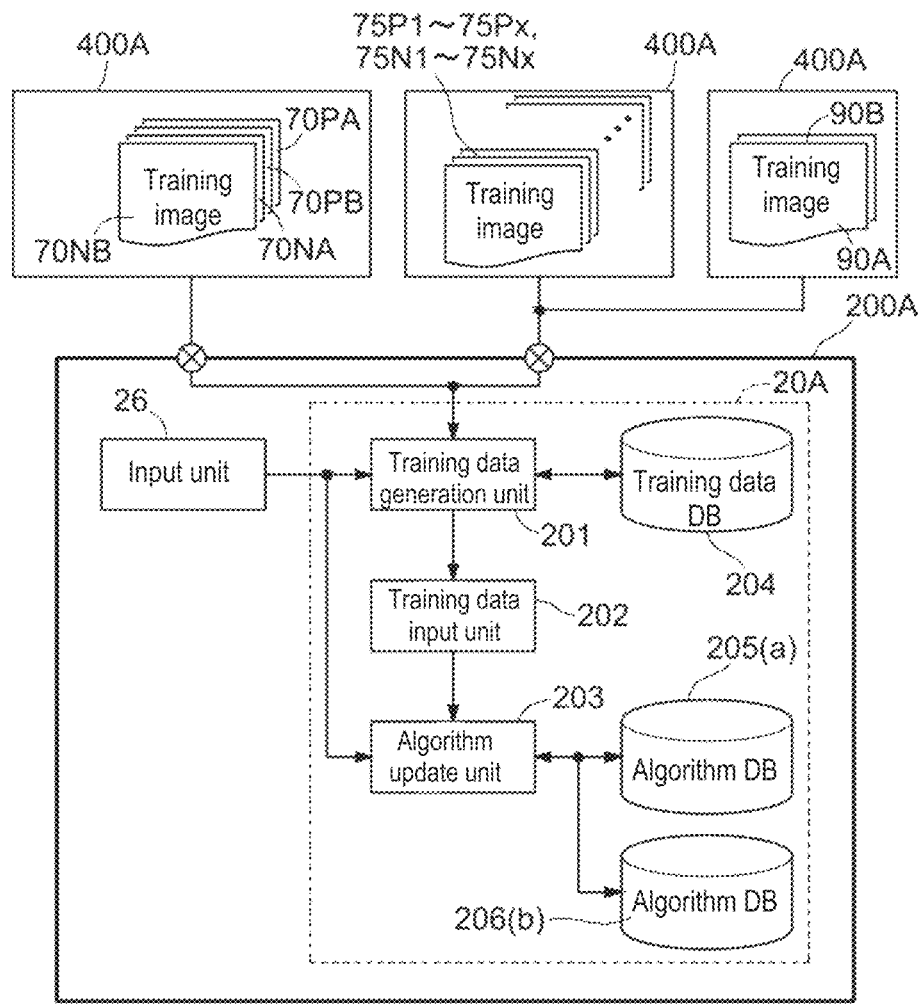
FIG. 15 shows a function block of the training device 200A.

The hardware structure of the training device 200A will be described with reference to FIG. 14. The training device 200A includes a control unit 20A, an input unit 26, and an output unit 27. The training device 200A can be connected to the network 99.

The control unit 20A includes a CPU (Central Processing Unit) 21 that performs data processing described later, a memory 22 used as a work area for data processing, a storage unit 23 that records a program and processing data described later, a bus 24 for transmitting data among each of the units, an interface (I/F) unit 25 for inputting/outputting data to/from an external device, and a GPU (Graphics Processing Unit) 29. The input unit 26 and the output unit 27 are connected to the control unit 20A via the I/F unit 25. Illustratively, the input unit 26 is an input device such as a keyboard or a mouse, and the output unit 27 is a display device such as a liquid crystal display. The GPU 29 functions as an accelerator for assisting arithmetic processing (for example, parallel arithmetic processing) performed by the CPU 21. In the following description, the processing performed by the CPU 21 means that the processing performed by the CPU 21 using the GPU 29 as an accelerator is also included. Here, instead of GPU 29, a chip which is preferable for the calculation of the neural network may be provided. Examples of such a chip include FPGA (Field-Programmable Gate Array), ASIC (Application Specific Integrated Circuit), Myriad X (Intel), and the like.

The control unit 20A sends a training program for training the artificial intelligence algorithm and an artificial intelligence algorithm in advance and in an executable format to the storage unit 23, for example, in order to perform the processing of each step described with reference to FIG. 16. The execution form is, for example, a form generated by being converted from a programming language by a compiler. The control unit 20A makes the operating system and the training program recorded in the storage unit 23 cooperate with each other to perform training processing of the artificial intelligence algorithm prior to the training.

In the following description, unless otherwise specified, the processing performed by the control unit 20A means the processing performed by the CPU 21 or the CPU 21 and the GPU 29 based on the program and the artificial intelligence algorithm stored in the storage unit 23 or the memory 22. The CPU 21 temporarily stores necessary data (intermediate data during processing and the like) using the memory 22 as a work area, and appropriately records data to be stored for a long period of time, such as a calculation result, in the storage unit 23.

(2) Function Structure of Training Device

Figure 16:
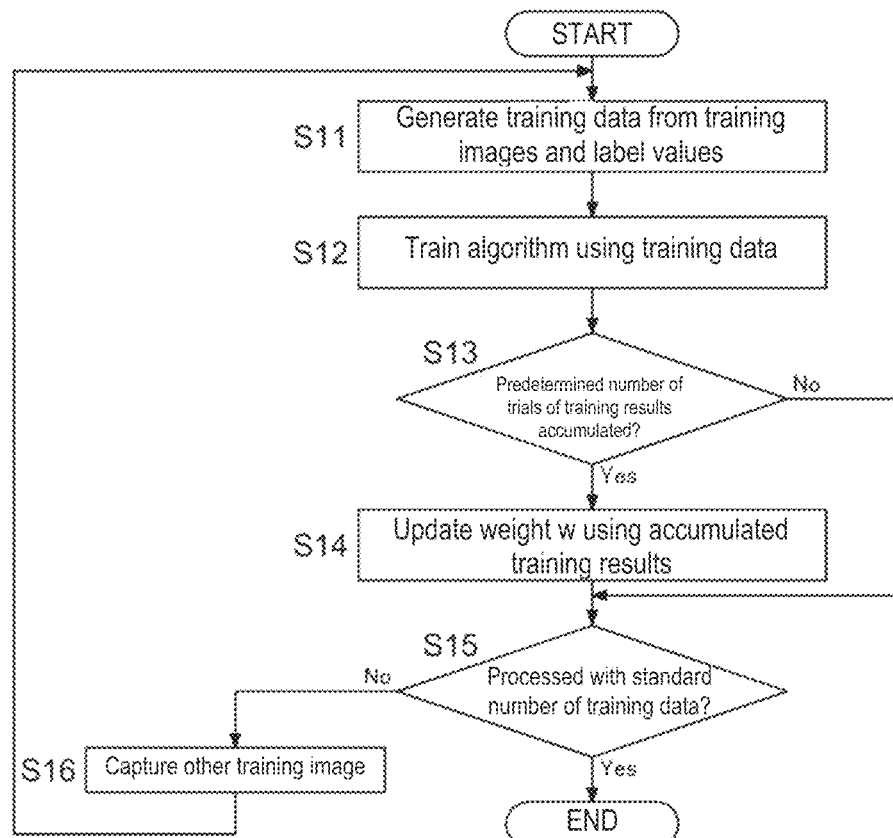
FIG. 16 shows a flowchart of a training process of the first artificial intelligence algorithm.
Figure 17:
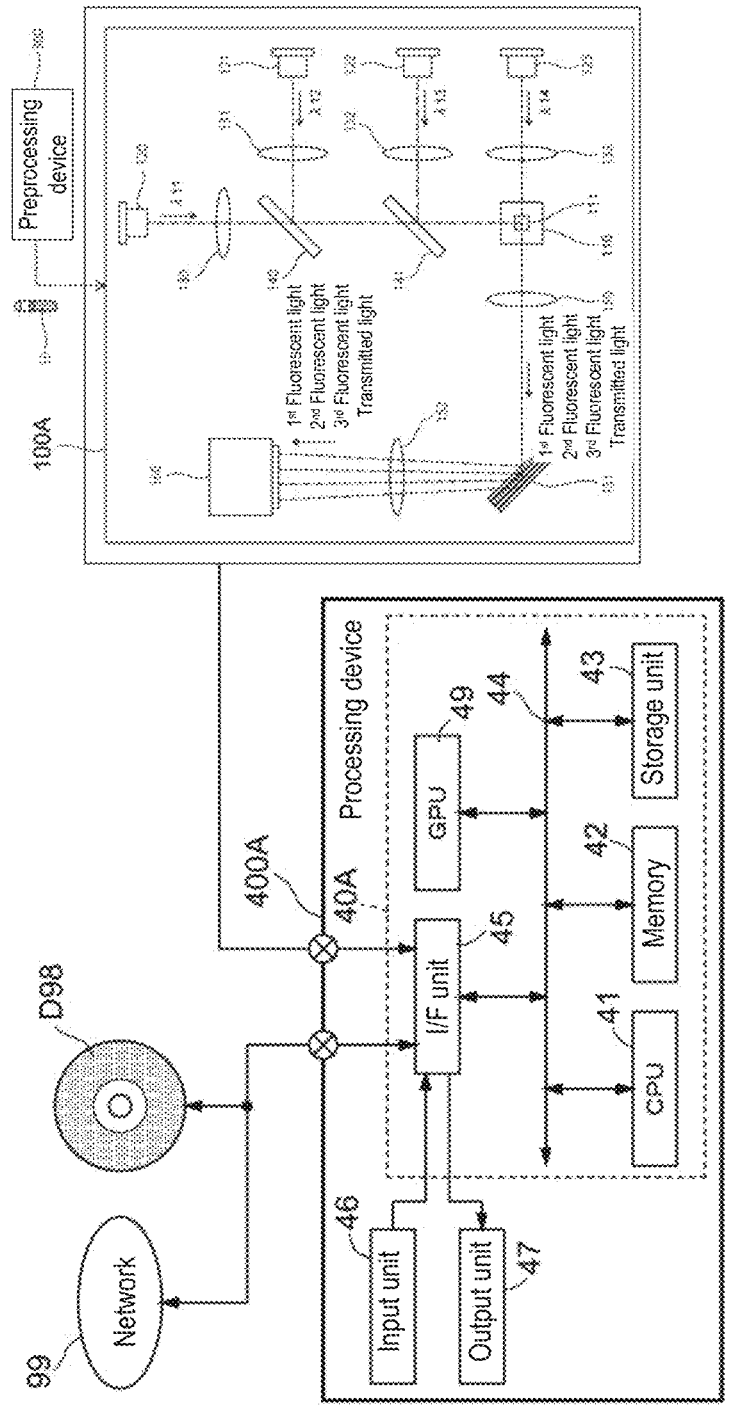
FIG. 17 shows a hardware structure of a cell imaging device 100A and a cell analysis device 400A.

FIG. 17 shows the function structure of the training device 200A. The training device 200A includes a training data generation unit 201, a training data input unit 202, an algorithm update unit 203, a training data database (DB) 204, and algorithm databases (DB) 205(a) and 205(b). Step S11 shown in FIG. 26 corresponds to the analysis data generation unit 201. Step S112 shown in step S12 in FIG. 16 corresponds to the training data input unit 202. Step S14 shown in FIG. 16 corresponds to the algorithm update unit 203.

The training images 70PA, 70PB, 70NA, 70NB, 75P1 to 75Px, 75N1 to 75Nx are acquired in advance from the cell imaging device 100A by the cell analysis device 400A, and are stored in advance in the storage unit 23 or the memory 22 of the control unit 20A of the training device 200A. The training device 200A also may acquire the training images 70PA, 70PB, 70NA, 70NB, 75P1 to 75Px and 75N1, to 75Nx from the cell analysis device 400A via the network, or may be acquired via the media drive D98. The training data database (DB) 204 stores the generated training data 73 and 78. The artificial intelligence algorithm prior to training is stored in advance in the algorithm databases 205(a) and 205(b). The trained first artificial intelligence algorithm 60 is recorded in the algorithm database 205(a) in association with the exam items and analysis items for inspecting chromosomal abnormalities. The trained second artificial intelligence algorithm 63 is recorded in the algorithm database 205(b) in association with the exam items and analysis items for testing peripheral circulating tumor cells.

(3) Training Process

The control unit 20A of the training device 200A performs the training process shown in FIG. 16.

First, in response to a request from the user to start processing, the CPU 21 of the control unit 20A acquires the training images 70PA, 70PB, 70NA, 70NB and the training images 75P1 to 75Px and 75N1 to 75Nx stored in the storage unit 23 or the memory 22. The training images 70PA, 70PB, 70NA, 70NB can be used to train the first artificial intelligence algorithm 50, and the training images 75P1 to 75Px, and 75N1 to 75Nx can be used to train the second artificial intelligence algorithm 53, respectively.

i. First Artificial Intelligence Algorithm 50 Training Process

In step S11 of FIG. 16, the control unit 20A generates positive integrated training data 72P from the positive training images 70PA and 70PB, and generates negative integrated training data 72N from the negative training images 70NA and 70NB. The control unit 20A assigns a label value 74P or a label value 74N corresponding to each of the positive integrated training data 72P and the negative integrated training data 72N, and generates a labeled positive integrated training data 73P or a labeled negative integrated training data 73N. The labeled positive integrated training data 73P or the labeled negative integrated training data 73N are recorded in the storage unit 23 as training data 73. The method for generating the labeled positive integrated training data 73P and the labeled negative integrated training data 73N is described in section 2-1 above.

Next, the control unit 20A inputs the generated labeled positive integrated training data 73P and the labeled negative integrated training data 73N into the first artificial intelligence algorithm 50 in step S12 of FIG. 16, and trains the first artificial intelligence algorithm 50. The training result of the first artificial intelligence algorithm 50 is aggregated each time the training is performed using the plurality of labeled positive integrated training data 73P and the labeled negative integrated training data 73N.

Subsequently, in step S13 of FIG. 16, the control unit 20A determines whether the training results for a predetermined number of trials have been accumulated. When the training results are accumulated for a predetermined number of trials (when "YES"), the control unit 20A proceeds to the process of step S14, and when the training results are not accumulated for a predetermined number of trials ("NO"), the control unit 20A proceeds to the process of step S15.

When the training results are accumulated for a predetermined number of trials, in step S14, the control unit 20A updates the weighting (w) (coupling weight) of the first artificial intelligence algorithm 50 using the training results accumulated in step S12.

Next, in step S15, the control unit 20A determines whether the first artificial intelligence algorithm 50 has been trained with a predetermined number of labeled positive integrated training data 73P and labeled negative integrated training data 73N. When the training is performed with the specified number of labeled positive integrated training data 73P and the labeled negative integrated training data 73N (in the case of "YES"), the training process is terminated. The control unit 20A stores the trained first artificial intelligence algorithm 60 in the storage unit 23.

When the first artificial intelligence algorithm 50 is not trained with the specified number of labeled positive integrated training data 73P and the labeled negative integrated training data 73N (in the case of "NO"), the control unit 20A advances from step S15 to step S16 and the processes from step S11 to step S15 are performed on the next positive training images 70PA and 70PB and the negative training images 70NA and 70NB.

ii. Second Artificial Intelligence Algorithm 53 Training Process

In step S11 of FIG. 16, the control unit 20A generates positive integrated training data 77P from positive training images 75P1 to 75Px, and generates negative integrated training data 77N from negative training images 75N1 to 75Nx. The control unit 20A assigns a label value 79P or a label value 79N corresponding to each of the positive integrated training data 77P and the negative integrated training data 77N, and generates labeled positive integrated training data 78P or labeled negative integrated training data 78N. The labeled positive integrated training data 78P or the labeled negative integrated training data 78N are recorded in the storage unit 23 as training data 78. The method for generating the labeled positive integrated training data 78P and the labeled negative integrated training data 78N is as described in 2-2 above.

Next, the control unit 20A inputs the generated labeled positive integrated training data 73P and the labeled negative integrated training data 73N into the second artificial intelligence algorithm 53 in step S12 of FIG. 16, and trains the second artificial intelligence algorithm 53. The training result of the second artificial intelligence algorithm 53 is accumulated every time the training is performed using the plurality of labeled positive integrated training data 78P and the labeled negative integrated training data 78N.

Subsequently, in step S13 of FIG. 16, the control unit 20A determines whether the training results for a predetermined number of trials have been accumulated. When the training results are accumulated for a predetermined number of trials (when "YES"), the control unit 20A proceeds to the process of step S14, and when the training results are not accumulated for a predetermined number of trials ("NO"), the control unit 20A proceeds to the process of step S15.

When the training results are accumulated for a predetermined number of trials, in step S14, the control unit 20A uses the training results accumulated in step S12 to update the weight w (coupling weight) of the second artificial intelligence algorithm 53.

Next, in step S15, the control unit 20A determines whether the second artificial intelligence algorithm 53 has been trained with a predetermined number of labeled positive integrated training data 78P and labeled negative integrated training data 78N. When training is performed with the specified number of labeled positive integrated training data 78P and labeled negative integrated training data 78N (in the case of "YES"), the training process is completed. The control unit 20A stores the trained second artificial intelligence algorithm 63 in the storage unit 23.

When the second artificial intelligence algorithm 53 is not trained with the specified number of labeled positive integrated training data 78P and the labeled negative integrated training data 78N (in the case of "NO"), the control unit 20A advances from step S15 to step S16, and the processes from step S11 to step S15 are performed on the next positive training images 75P1 to 75Px and the negative training images 75N1 to 75Nx.

(4) Training Program

The present embodiment includes a computer program for training an artificial intelligence algorithm that causes a computer to execute the processes of steps S11 to S16.

An implementation of the present embodiment relates to a program product such as a storage medium that stores the computer program. That is, the computer program can be stored on a hard disk, a semiconductor memory element such as a flash memory, or a storage medium such as an optical disk. The recording format of the program on the storage medium is not limited insofar as the training device 200A can read the program. Recording on the storage medium is preferably non-volatile.

Here, the "program" is a concept including not only a program that can be directly executed by the CPU, but also a source format program, a compressed program, an encrypted program, and the like.

3-1-2. Cell Imaging Device

FIG. 17 shows the structure of the cell imaging device 100A that captures the training images 70, 75 and/or the analysis images 80 and 85. The cell imaging device 100A shown in FIG. 17 is exemplified by an imaging flow cytometer. The operation of the cell imaging device 100A as an imaging device is controlled by the cell analysis device 400A.

As described above, chromosomal abnormalities or peripheral circulating tumor cells use one or more fluorescent dyes to detect the target site. Preferably, the FISH method uses two or more fluorescent dyes to detect a target site on the first chromosome and a target site on the second chromosome (the "first" and "second" that modify the "chromosome" is a comprehensive concept of numbers that do not mean chromosome numbers). For example, a probe that hybridizes with the PML locus is labeled by a first fluorescent dye in which a nucleic acid having a sequence complementary to the base sequence of the PML locus is irradiated with light of wavelength λ11 to generate first fluorescence of wavelength λ21. With this probe, the PML locus is labeled with the first fluorescent dye. In the probe that hybridizes with the RARA locus, a nucleic acid having a sequence complementary to the base sequence of the RARA locus is labeled with a second fluorescent dye that produces a second fluorescence of a wavelength $\lambda 22$ when irradiated with light of a wavelength $\lambda 12$. Using this probe, the RARA locus is labeled with a second fluorescent dye. The nucleus is stained with a dye for nuclear staining that produces a third fluorescence of wavelength $\lambda 23$ when irradiated with light of wavelength $\lambda 13$. The wavelength $\lambda 11$, the wavelength $\lambda 12$, and the wavelength $\lambda 13$ are so-called excitation lights. The wavelength $\lambda 114$ is light emitted from a halogen lamp or the like for bright field observation.

The cell imaging device 100A includes a flow cell 110, a light source 120 to 123, a condenser lens 130 to 133, a dichroic mirror 140 to 141, a condenser lens 150, an optical unit 151, a condenser lens 152, and an imaging unit 160. The sample 10 is flowed through the flow path 111 of the flow cell 110.

The light sources 120 to 123 irradiate light on the sample 10 flowing from the bottom to the top of the flow cell 110. The light sources 120 to 123 are configured of, for example, a semiconductor laser light source. Lights having wavelengths $\lambda 11$ to $\lambda 14$ are emitted from the light sources 120 to 123, respectively.

The condenser lenses 130 to 133 collect light having wavelengths $\lambda 11$ to $\lambda 14$ emitted from light sources 120 to 123, respectively. The dichroic mirror 140 transmits light having a wavelength of $\lambda 11$ and refracts light having a wavelength of $\lambda 12$. The dichroic mirror 141 transmits light having wavelengths $\lambda 11$ and $\lambda 12$ and refracts light having wavelength $\lambda 13$. In this way, light having wavelengths $\lambda 11$ to $\lambda 14$ is applied to the sample 10 flowing through the flow path 111 of the flow cell 110. The number of semiconductor laser light sources included in the cell imaging device 100A is not limited insofar as it is 1 or more. The number of semiconductor laser light sources can be selected from, for example, 1, 2, 3, 4, 5 or 6.

When the sample 10 flowing through the flow cell 110 is irradiated with light having wavelengths $\lambda 11$ to $\lambda 13$, fluorescence is generated from the fluorescent dye labeled on the cells flowing through the flow path 111. Specifically, when the light of the wavelength $\lambda 11$ is irradiated on the first fluorescent dye that labels the PML locus, a first fluorescence of the wavelength $\lambda 21$ is generated from the first fluorescent dye. When light of wavelength $\lambda 12$ is irradiated on the second fluorescent dye that labels the RARA locus, the second fluorescent dye produces a second fluorescence of wavelength $\lambda 22$. When light of wavelength $\lambda 13$ is irradiated on the dye for nuclear dyeing that stains the nucleus, the dye for nuclear dyeing produces a third fluorescence of wavelength $\lambda 23$.

When the sample 10 flowing through the flow cell 110 is irradiated with light having a wavelength of $\lambda 14$, this light passes through the cells. The transmitted light of wavelength $\lambda 14$ transmitted through the cells is used to generate a brightfield image. For example, in the embodiment, the first fluorescence is the wavelength region of green light, the second fluorescence is the wavelength region of red light, and the third fluorescence is the wavelength region of blue light.

The condenser lens 150 collects the first fluorescence to the third fluorescence generated from the sample 10 flowing through the flow path 111 of the flow cell 110 and the transmitted light transmitted through the sample 10 flowing through the flow path 111 of the flow cell 110. The optical unit 151 has a configuration in which four dichroic mirrors are combined. The four dichroic mirrors of the optical unit 151 reflect the first fluorescence to the third fluorescence and the transmitted light at slightly different angles, and separate them on the light receiving surface of the imaging unit 160. The condenser lens 152 collects the first fluorescence to the third fluorescence and the transmitted light.

The imaging unit 160 is configured by a TDI (Time Delivery Integration) camera. The imaging unit 160 captures the first fluorescence to the third fluorescence and the transmitted light to obtain a fluorescence image corresponding to the first fluorescence to the third fluorescence and a bright field image corresponding to the transmitted light, which are output as imaging signals to the cell analysis device 400A. The image to be captured may be a color image or a grayscale image.

The cell imaging device 100A also may be provided with a pretreatment device 300 as necessary. The pretreatment device 300 samples a portion of the sample and performs FISH, immunostaining, intracellular organelle staining, or the like on the cells contained in the sample to prepare the sample 10.

3-1-3. Cell Analysis Device

(1) Hardware Structure

The hardware structure of the cell analyzer 400A will be described with reference to FIG. 17. The cell analysis device 400A is communicably connected to the cell imaging device 100A. The cell analysis device 400A includes a control unit 40A, an input unit 46, and an output unit 47, and a media drive 98. The cell analysis device 400A can be connected to the network 99.

The structure of the control unit 40A is the same as the structure of the control unit 20A of the training device 200A. Here, the CPU 21, the memory 22, the storage unit 23, the bus 24, the I/F unit 25, and the GPU 29 in the control unit 20A of the training device 200A are replaced with the CPU 41, the memory 42, the storage unit 43, the bus 44, and the I/F unit 45, and GPU 49, respectively. However, the storage unit 43 stores the trained artificial intelligence algorithms 60 and 63 generated by the training device 200A and acquired by the CPU 41 from the I/F unit 45 via the network 99 or the media drive 98.

The analysis images 80 and 85 can be acquired by the cell imaging device 100A and stored in the storage unit 43 or the memory 42 of the control unit 40A of the cell analysis device 400A.

(2) Function Structure of Cell Analysis Device

Figure 18:
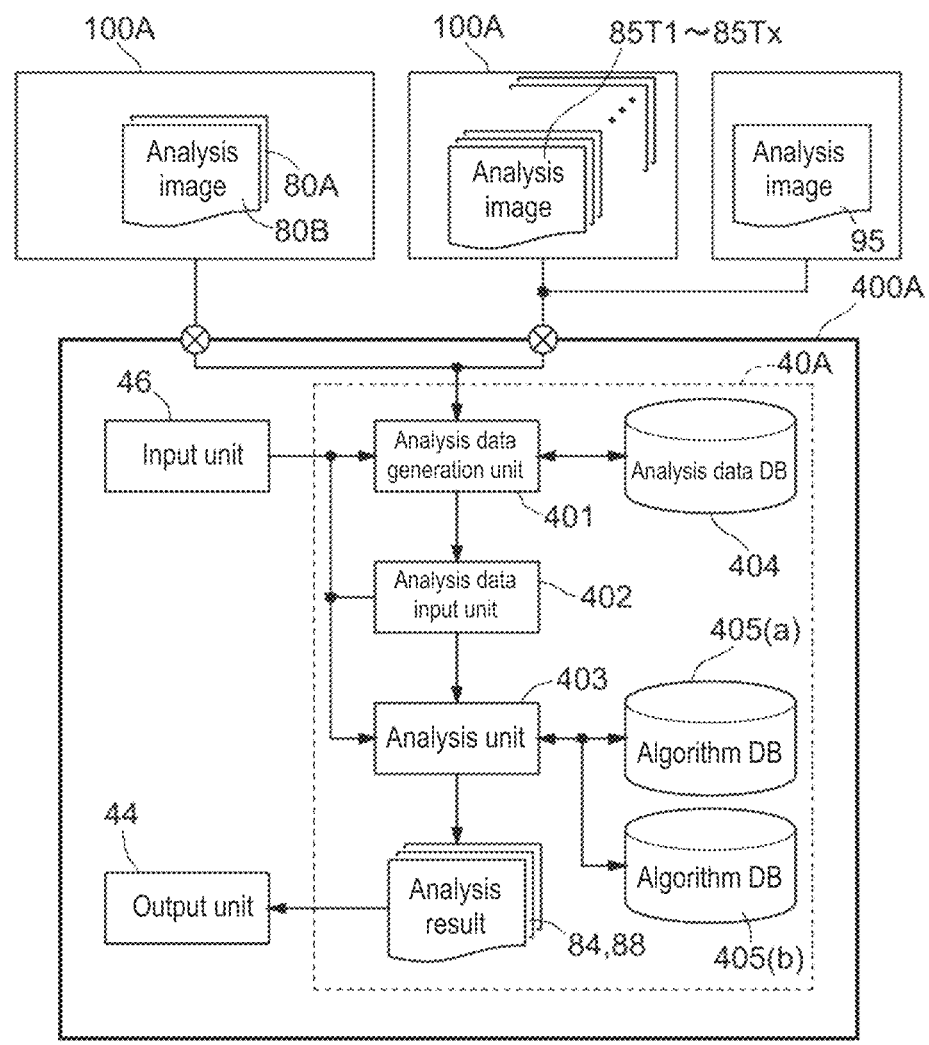
FIG. 18 shows a function block of the cell analysis device 400A.

FIG. 18 shows the function structure of the cell analysis device 400A. The cell analysis device 400A includes an analysis data generation unit 401, an analysis data input unit 402, an analysis unit 403, an analysis data database (DB) 404, and an algorithm databases (DB) 405(a) and 405(b). Step S21 shown in FIG. 19 corresponds to the analysis data generation unit 401. Step S22 shown in FIG. 19 corresponds to the analysis data input unit 402. Step S23 shown in FIG. 19 corresponds to the analysis unit 403. The analysis data database 404 stores analysis data 82, 88.

The trained first artificial intelligence algorithm 60 is recorded in the algorithm database 405(a) in association with the exam items and analysis items for inspecting chromosomal abnormalities. The trained second artificial intelligence algorithm 63 is recorded in the algorithm database 405(b) in association with the exam items and analysis items for testing peripheral circulating tumor cells.

(3) Cell Analysis Process

Figure 19:
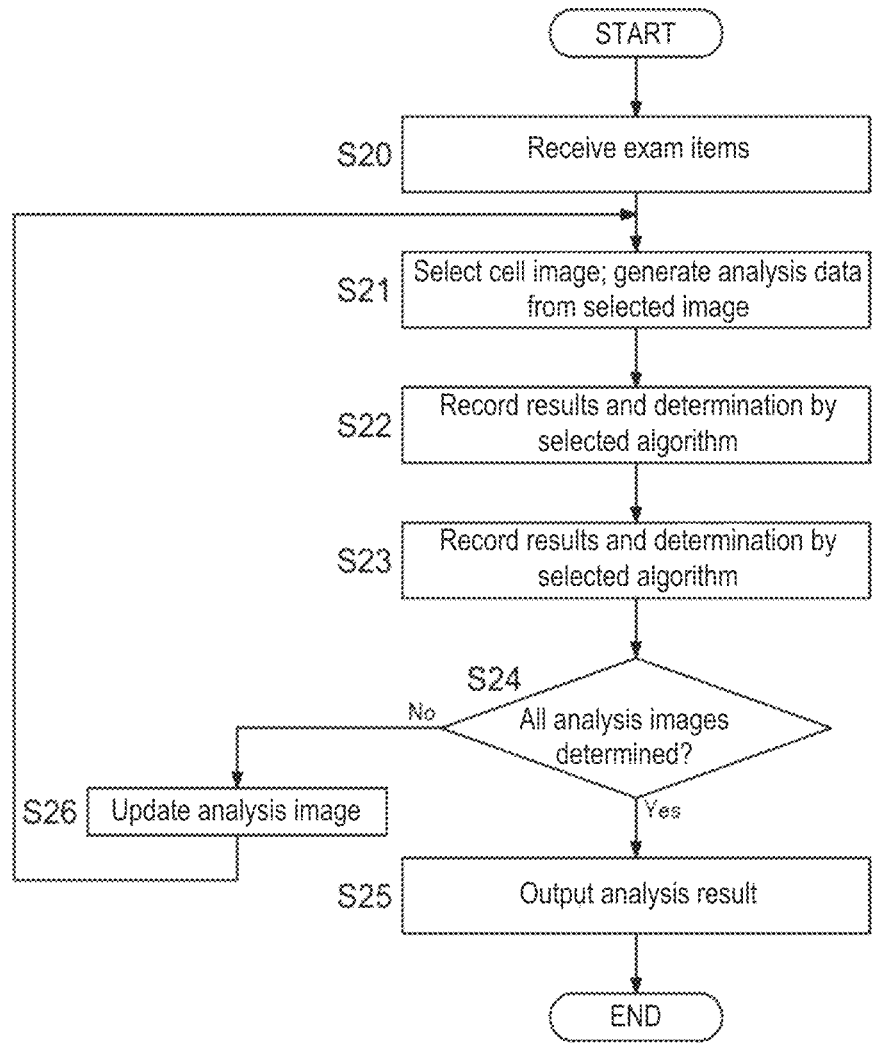
FIG. 19 shows a flowchart of a cell analysis process.

The control unit 40A of the cell analysis device 400A performs the cell analysis process shown in FIG. 19. This embodiment facilitates high-precision and high-speed analysis.

The CPU 41 of the control unit 40A starts the cell analysis process according to a request from the user to start the process or when the cell imaging device 100A starts the analysis.

The control unit 40A receives an exam item by the input unit 46 in step S20 shown in FIG. 19. Specifically, the exam item is accepted by reading the information about the exam item from the barcode attached to each sample by the barcode reader which is an example of the input unit 46. In step S21, the control unit 40A selects a channel to be used for generating analysis data from the cell image of each channel output from the cell imaging device 100A according to the exam item received in step S20, selects the channel to be used to generate the analysis data, acquires the cell image corresponding to the selected channel, and generates the u=integrated analysis data 82 or integrated analysis data 87. The method of generating the integrated analysis data 82 is as described in section 2-1 above. The method of generating the integrated analysis data 87 is as described in section 2-2 above. The control unit 40A stores the generated integrated analysis data 82 or integrated analysis data 87 in the storage unit 43 or the memory 42.

In step S22, the control unit 40A selects the first artificial intelligence algorithm 60 or the second artificial intelligence algorithm 63 according to the exam item received in step S20. The received exam item and the artificial intelligence algorithm are linked by the exam item/algorithm table shown in FIG. 20. The exam item/algorithm table is stored in the storage unit 43. The exam item/algorithm table shown in FIG. 20 exemplifies "chromosomal abnormalities" and "peripheral circulating tumor cells" as "exam items". The exam item "chromosomal abnormality" corresponds to "BCR-ABL", "PML-RARA", "IGH-CCND1, IGH-FGFR3, IGH-MAF" as analysis items, and the exam item "peripheral circulating tumor cells" corresponds to "CTC" as an analysis item. In addition, each exam item has labels of "green", "yellow", "blue", and "red" indicating the wavelength region of fluorescence labeled on the target site, and "bright" indicating brightfield imaging is labeled "Field of View". The wavelength range of each fluorescence label of "ch1", "ch2", "ch3", "ch4", and "brightfield", which are labels of the names of imaging channels corresponding to region and bright field imaging, also are attached. Then, the trained first artificial intelligence algorithm 60 is associated with the analysis items "BCR-ABL", "PML-RARA", and "IGH-CCND1, IGH-FGFR3, IGH-MAF". A trained second artificial intelligence algorithm 63 is associated with the analysis item "CTC".

In step S22, when the exam item is "chromosomal abnormality", the control unit 40A selects the first artificial intelligence algorithm 60 according to the label of the analysis item, whereas when the second artificial intelligence algorithm 63 is selected according to the label of the analysis item when the exam item is "peripheral circulating tumor cells".

In step S23, the control unit 40A uses the selected first artificial intelligence algorithm 60 or the second artificial intelligence algorithm 63 to determine the properties of the analysis target cells in the analysis images 80A and 80B, and stores the label value 84 of the determination result in the storage unit 43 or the memory 42. The determination method is as described in sections 2-1 and 2-2 above.

The control unit 40A determines whether all the analysis images 80A and 80B have been determined in step S24, and when all the analysis images 80A and 80B have been determined (in the case of "YES"), proceeds to step S25, and the determination result corresponding to the label value 84 of the determination result is stored in the storage unit 43, and the determination result is output to the output unit. When all the analysis images 80A and 80B are not determined in step S24 (in the case of "NO"), the control unit 40A updates the analysis images 80A and 80B in step S26, and step S21 to step S24 are repeated until the determinations are made for all the analysis images 80A and 80B. Although the determination result may be the label value itself, the determination result also may be a label such as "yes", "no" or "abnormal", "normal" corresponding to each label value.

(4) Cell Analysis Program

The present embodiment includes a computer program for performing cell analysis that causes a computer to perform the processes of steps S20 to S26 and steps S221 to S222.

An implementation of the present embodiment relates to a program product such as a storage medium that stores the computer program. That is, the computer program can be stored on a hard disk, a semiconductor memory element such as a flash memory, or a storage medium such as an optical disk. The recording format of the program on the storage medium is not limited insofar as the training device 200A can read the program. Recording on the storage medium is preferably non-volatile.

Here, the "program" is a concept including not only a program that can be directly executed by the CPU, but also a source format program, a compressed program, an encrypted program, and the like.

4. Other Embodiments

(1) Modification Example of Analysis Device

In the first embodiment, the control unit 40A is described in terms of an example of selecting an artificial intelligence algorithm based on the exam items received in S20. However, instead of the exam item, it may be based on the analysis mode shown in FIGS. 36 and 37.

Figure 36:
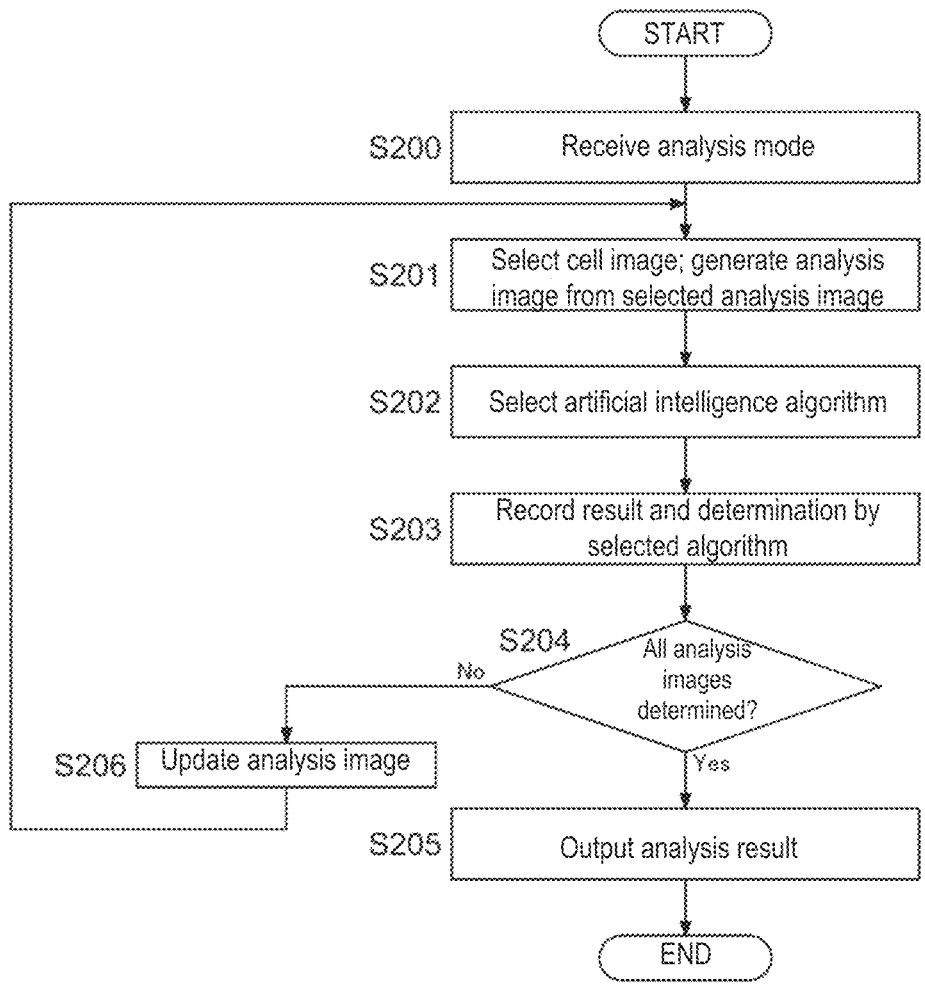
FIG. 36 shows a flowchart of a cell analysis process.
Figure 37:
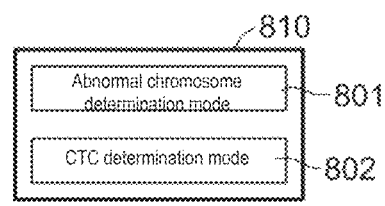
FIG. 37 shows an example of an analysis mode reception screen.

The control unit 40A accepts the analysis mode by the input unit 46 in step S200 shown in FIG. 36. Specifically, the analysis mode reception screen shown in FIG. 37 is displayed on the touch panel display having the functions of the input unit 46 and the output unit 47, and the analysis is performed by accepting the chromosomal abnormality determination mode button 801 or the CTC determination mode 802. n step S201, the control unit 40A selects a channel to be used for generating analysis data from the cell image of each channel output from the cell imaging device 100A according to the exam item received in step S200, selects the channel to be used to generate the analysis data, acquires the cell image corresponding to the selected channel, and generates the integrated analysis data 82 or integrated analysis data 87. The method of generating the integrated analysis data 82 is as described in section 2-1 above. The method of generating the integrated analysis data 87 is as described in section 2-2 above. The control unit 40A stores the generated integrated analysis data 82 or integrated analysis data 87 in the storage unit 43 or the memory 42.

In step S202, the control unit 40A selects the first artificial intelligence algorithm 60 when the received analysis mode is the "chromosomal aberration determination mode", and selects the second artificial intelligence algorithm 63 when the received analysis mode is the "CTC determination mode".

In step S23, the control unit 40A uses the selected first artificial intelligence algorithm 60 or the second artificial intelligence algorithm 63 to determine the properties of the analysis target cells in the analysis images 80A and 80B, and stores the label value 84 of the determination result in the storage unit 43 or the memory 42. The determination method is as described in sections 2-1 and 2-2 above.

Since the processing of steps S204 to S206 by the control unit 40A is the same as that of steps S24 to S26 described with reference to FIG. 19, the description thereof will be omitted.

(2) Modification Example of the Imaging Unit

Figure 21:
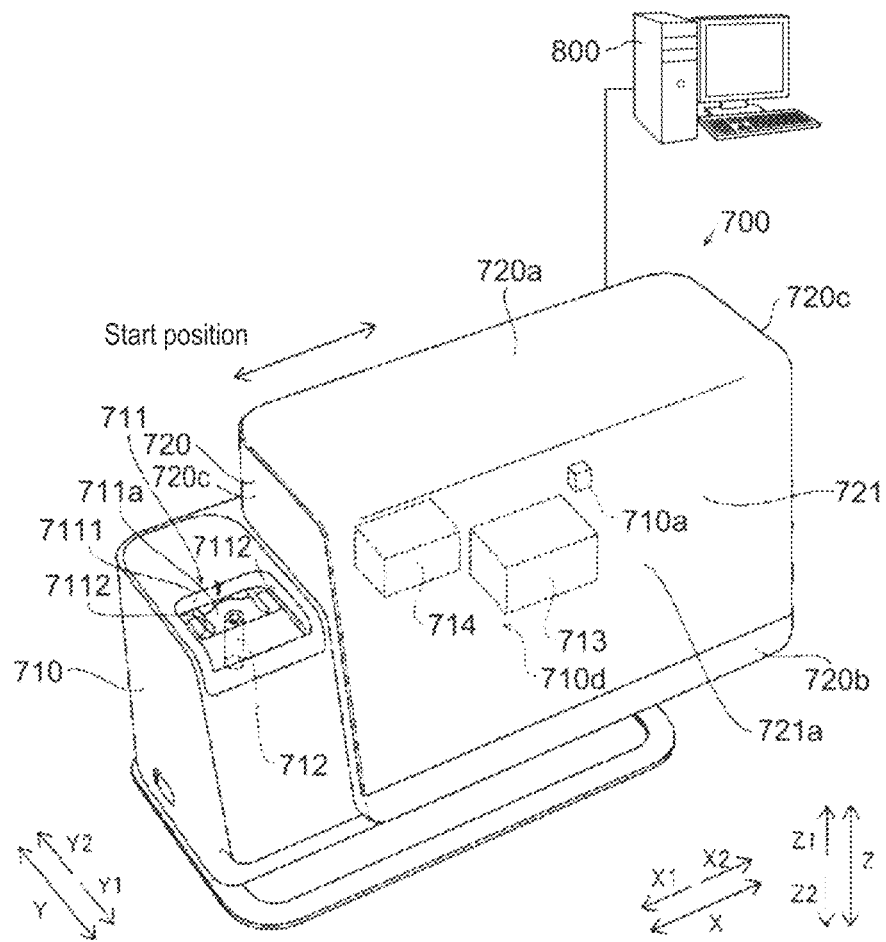
FIG. 21 shows a hardware structure when the cell imaging device is a microscope.

In the first embodiment, the above sections 1 to 4 have described an example in which the imaging unit 160 is provided in the imaging flow cytometer. However, the microscope 700 shown in FIGS. 21 and 22 also may be used instead of the imaging flow cytometer. Here, the microscope shown in FIG. 21 is disclosed in US Pat. No. 2018-0074308 and is incorporated herein by reference.

As shown in FIG. 21, the microscope device 700 includes a housing unit 710 and a moving unit 720. The microscope device 700 includes an imaging unit 710d and a slide installation unit 711. The imaging unit 710d includes an objective lens 712, a light source 713, and an imaging element 714. The slide installation unit 711 is provided on the upper surface (the surface on the Z1 direction side) of the housing unit 710. The objective lens 712, the light source 713, and the image sensor 714 are provided inside the housing unit 710. The microscope device 700 includes a display unit 721. The display unit 721 is provided on the front surface (the surface on the Y1 direction side) of the moving unit 720. The display surface 721a of the display unit 721 is arranged on the front side of the moving unit 720. The microscope device 700 includes a drive unit 710a that moves the moving unit 720 relative to the housing unit 710.

The slide installation unit 711 includes a stage 711a. The stage 711a can move in the horizontal direction (X direction and Y direction) and in the vertical direction (Z direction). The stage 711a can move independently of each other in the X direction, the Y direction, and the Z direction. In this way the slide can be moved relative to the objective lens 712, so that the desired position of the slide can be magnified and viewed.

The objective lens 712 is arranged close to the stage 711a of the slide installation unit 711. The objective lens 712 is arranged close to the lower side (Z2 direction) of the stage 711a of the slide installation unit 711. The objective lens 712 is provided so as to face the slide installation unit 711 in the vertical direction (Z direction). The objective lens 712 is arranged so that the optical axis is substantially perpendicular to the slide installation surface on which the slide of the slide installation unit 711 is installed. The objective lens 712 is arranged so as to face upward. The objective lens 712 can move relative to the slide installation unit 711 in the vertical direction (Z direction). The objective lens 712 is arranged so as to have a longitudinal direction in the vertical direction. That is, the objective lens 712 is arranged so as to have an optical axis in the substantially vertical direction. The objective lens 712 includes a plurality of lenses.

The light source 713 can irradiate the slide coated with the sample with light. The light source 713 irradiates the slide with light via the objective lens 712. The light source 713 irradiates the slide with light from the same side as the image sensor 714. The light source 713 can output light having a predetermined wavelength. The light source 713 can output light having a plurality of different wavelengths. That is, the light source 713 can output different types of light. The light source 713 includes a light emitting element. The light emitting element includes, for example, an LED element, a laser element, and the like.

Figure 22:
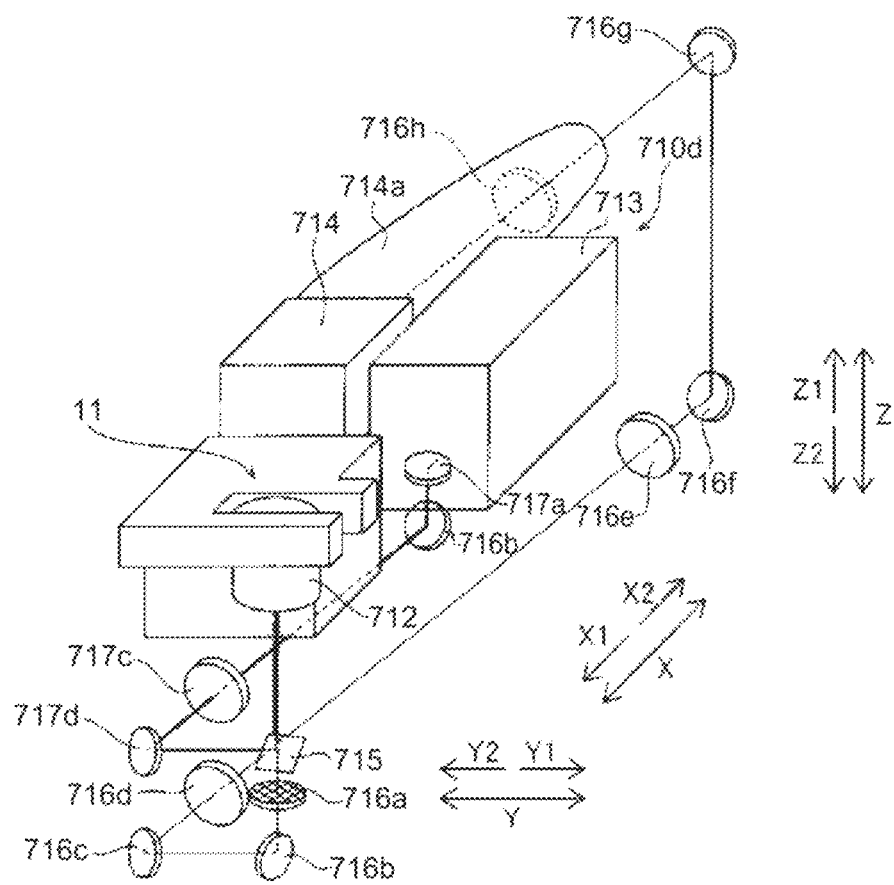
FIG. 22 shows the structure of the optical system of a microscope.

FIG. 22 shows a structural example of the optical system of the microscope device 700. The microscope device 700 includes an objective lens 712, a light source 713, an image sensor 714, a first optical element 715, a filter 716a, a second optical elements 716b, 716c, 716f, and 716g, lenses 716d, 716e and 716h, reflective parts 717a, 717b and 717d, and a lens 717c. The objective lens 712, the light source 713, the image sensor 714, and the first optical element 715, the filter 716a, the second optical elements 716b, 716c, 716f and 716g, the lenses 716d, 716e and 716h, the reflecting parts 717a, 717b and 717d, and the lens 717c are located within the housing unit 710.

The first optical element 715 is configured to reflect the light emitted from the light source 713 in the optical axis direction of the objective lens 712, and transmit the light from the slide. The first optical element 715 includes, for example, a dichroic mirror. That is, the first optical element 715 is configured to reflect light having a wavelength emitted from the light source 713 and transmit the wavelength of light generated from the slide.

The filter 716a is configured to transmit light of a predetermined wavelength to block light of other wavelengths, or to block light of a predetermined wavelength and transmit light of other wavelengths. That is, light of a desired wavelength is transmitted by the filter 716a and reaches the image sensor 714.

The second optical elements 716b, 716c, 716f and 716g are configured to reflect the light from the slide toward the image sensor 714. The second optical elements 716b, 716c, 716f and 716g include a reflecting part. The second optical elements 716b, 716c, 716f and 716g include, for example, a mirror.

The reflecting parts 717a, 717b and 717d are configured to reflect the light from the light source 713 toward the objective lens 712. Reflecting parts 717a, 717b and 717d include, for example, mirrors.

The light emitted from the light source 713 is reflected by the reflecting portion 717a and incident on the reflecting portion 17b. The light incident on the reflecting portion 717b is reflected and incident on the reflecting portion 717d via the lens 717c. The light incident on the reflecting portion 717d is reflected and incident on the first optical element 715. The light incident on the first optical element 715 is reflected and reaches the slide installation portion 11 via the objective lens 712, and is irradiated to the slide.

The light emitted from the slide based on the light of the light source 713 is incident on the first optical element 715 via the objective lens 712. The light incident on the first optical element 715 is transmitted and enters the second optical element 716b through the filter 716a. The light incident on the second optical element 716b is reflected and incident on the second optical element 716c. The light incident on the second optical element 716c is reflected and incident on the second optical element 716f via the lenses 716d and 716e. The light incident on the second optical element 716f is reflected and incident on the second optical element 716g. The light incident on the second optical element 716g is reflected and reaches the image pickup element 714 via the lens 16h. The image sensor 714 captures an enlarged image of the slide based on the light that reaches it.

The captured image is transmitted from the microscope 700 to the computer 800 shown in FIG. 21. The computer 800 corresponds to a generator (200A) and/or a cell analyzer (400A).

III. Second Embodiment

A second embodiment relates to a method of analyzing a cell using an artificial intelligence algorithm from waveform data based on signal strength from the cell.

1. Cell Analysis Method

The present embodiment relates to a cell analysis method for analyzing cells contained in a biological sample. In the analysis method, numerical data corresponding to the signal strength for each cell is input to the third artificial intelligence algorithm 560 or the fourth artificial intelligence algorithm 563 having a neural network structure. Then, based on the result output from the third artificial intelligence algorithm 560 or the fourth artificial intelligence algorithm 563, the type of cell for which the signal strength has been acquired is determined for each cell.

The type of cell to be determined in a certain form of the present embodiment is based on the type of cell based on the morphological classification, and differs depending on the type of the biological sample. When the biological sample is blood and the blood is collected from a healthy person, the types of cells to be determined in this embodiment include erythrocytes, nucleated cells such as leukocytes, and platelets, included. Nucleated cells include neutrophils, lymphocytes, monocytes, eosinophils and basophils. Neutrophils include lobulated neutrophils and rod-shaped neutrophils. On the other hand, when the blood is collected from an unhealthy person, the nucleated cells may contain at least one selected from the group consisting of immature granulocytes and abnormal cells. Such cells are also included in the type of cells to be determined in this embodiment. Immature granulocytes can include cells such as metamyelocytes, myelocytes, promyelocytes, and myeloblasts.

A method of generating training data 575 and a method of analyzing waveform data will be described with reference to the examples shown in FIGS. 23 to 25. Here, the term "train" or "training" may be used in place of the term "generate" or "generating". For convenience of description, "analysis target image" may be referred to as "analysis image", "data to be analyzed" may be referred to as "analysis data", "image for training" may be referred to as "training image", and "data for training" may be referred to as "training data". The "fluorescent image" is intended to be a training image obtained by imaging a fluorescent label or an analysis image obtained by imaging a fluorescent label.

(1) Training Data Generation

Figure 23:
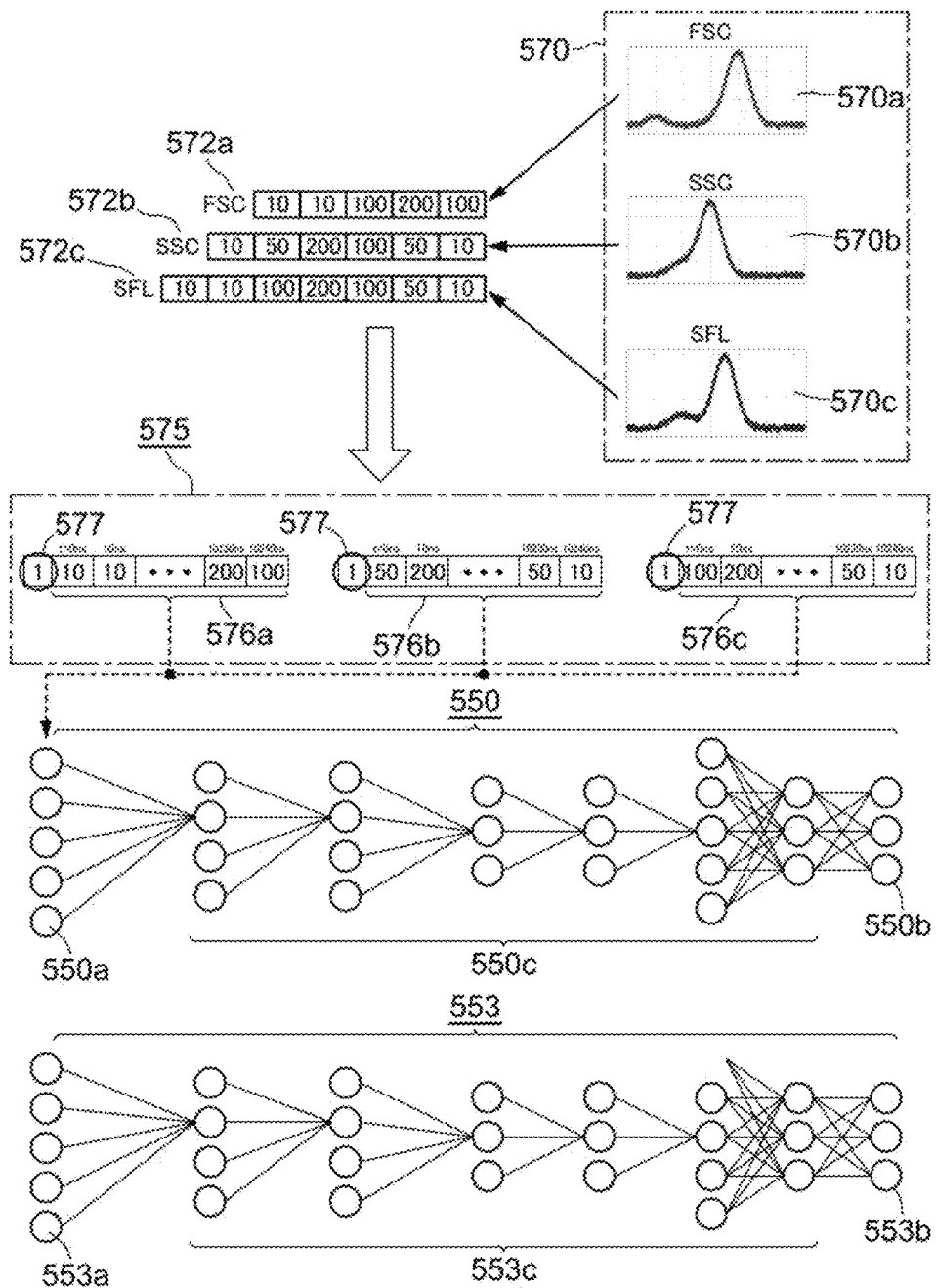
FIG. 23 shows an example of a method of generating training data.

The example shown in FIG. 23 is an example of a method for generating training waveform data used for training a third artificial intelligence algorithm for determining the types of leukocytes, immature granulocytes, and abnormal cells. The waveform data for forward scattered light 570a, the waveform data 570b for lateral scattered light, and the waveform data 570c for lateral fluorescence, which are the waveform data for training, are associated with the cells to be trained. Waveform data of forward scattered light 570a, waveform data of side scattered light 570b, and waveform data 570c of lateral fluorescence also are referred to as training waveform data 570. The training waveform data 570a, 570b, and 570c obtained from the training target cells may be waveform data obtained by flow cytometry of cells whose cell types are known based on morphological classification. Alternatively, waveform data of cells whose cell type has already been determined from a scattergram of a healthy person may be used. Further, as the waveform data in which the cell type of a healthy person is determined, a pool of waveform data of cells acquired from a plurality of people may be used. The sample for acquiring the training waveform data 570a, 570b, and 570c is preferably processed from a sample containing cells of the same type as the cells to be trained by the same sample processing method as the sample containing the cells to be trained. It is preferable that the training waveform data 570a, 570b, and 570c are acquired under the same conditions as those for the cells to be analyzed. The training waveform data 570a, 570b, and 570c can be obtained in advance for each cell by, for example, a known flow cytometry or sheath flow electrical resistance method. Here, when the cells to be trained are erythrocytes or platelets, the training data may be waveform data acquired by the sheath flow electric resistance method, and the waveform data may be a type obtained from the electrical signal strength.

In the example shown in FIG. 23, training waveform data 570a, 570b, and 570c acquired by flow cytometry using Sysmex XN-1000 are used. For the training waveform data 570a, 570b, and 570c, for example, after the forward scattered light reaches a predetermined threshold, acquisition of the forward scattered light signal intensity, the side scattered light signal intensity, and the side fluorescence signal intensity is started, and in this example, waveform data are acquired at a plurality of time points at regular intervals for one training target cell until the acquisition is completed after a predetermined time. Examples of acquiring waveform data at a plurality of time points at regular intervals include 1024 points at 10 nanosecond intervals, 128 points at 80 nanosecond intervals, 64 points at 160 nanosecond intervals, and the like. For waveform data, the cells contained in the biological sample are flowed through the flow path for cell detection in the measurement unit, which is equipped with a flow cytometer, a sheath flow electric resistance type measuring device, or the like which can detect cells individually and are acquired for individual cells passing through the flow path. Specifically, a data group having a value indicating the time at which the signal strength was acquired and a value indicating the signal strength at that time as elements is acquired for each signal at multiple time points during the passage of one trained cell through a predetermined position in the flow path, and is used as training waveform data 570a, 570b, and 570c. The information about the time point is not limited insofar as it can be stored so that the control units 10T and 20T, which will be described later, can determine how much time has passed since the acquisition of the signal strength was started. For example, the information at the time point may be the time from the start of measurement, or may be the number of points. It is preferable that the signal strength is stored in the storage units 13, 23 or the memories 12, 22 described later together with the information at the time when the signal strength is acquired.

The training waveform data 570a, 570b, and 570c in FIG. 23 are represented by raw data values, such as forward scattered light sequence data 572a, side scattered light sequence data 572b, and side fluorescence sequence data 572c. The sequence data 572a, 572b, and 572c are synchronized at the time when the signal intensity is acquired for each training target cell, and the sequence data 576a of the forward scattered light, the sequence data 576b of the side scattered light, and the sequence data 576c of the lateral fluorescence are synchronized. That is, the second numerical value from the left of 576a is the signal strength at the time t=0 when the measurement is started, which is 10. Similarly, the second numerical value from the left of 576b and 576c is the signal strength at the time t=0 when the measurement is started, and is 50 and 100, respectively. Adjacent cells inside the respective sequence data 576a, 576b, and 576c store signal intensities at intervals of 10 nanoseconds. The sequence data 576a, 576b, and 576c are combined with a label value of 577 indicating the type of training target cell, and the three signal strengths at the same point (forward scattered light signal strength, side scattered light signal strength, and side) become a set of training data 575 that is input to the third artificial intelligence algorithm 550. For example, when the target training cell is a neutrophil, the sequence data 576a, 576b, and 576c are given "1" as a label value 577 indicating that the cell is a neutrophil, and training data 575 are generated. FIG. 24 shows an example of the label value 577. Since the training data 575 are generated for each cell type, the label value is given a different label value of 577 depending on the cell type. Here, the synchronization at the time when the signal intensity is acquired is, for example, combined at the same time in the sequence data 572a of the forward scattered light, the sequence data 572b of the side scattered light, and the sequence data 572c of the side fluorescence for the time from the start of measurement to match the measurement points. In other words, the sequence data 572a of the forward scattered light, the sequence data 572b of the laterally scattered light, and the sequence data 572c of the lateral fluorescence each have the signal strength acquired at the same time in one cell passing through the flow cell. Although the measurement start time may be a time when the signal intensity of the forward scattered light exceeds a predetermined threshold value such as a threshold value, another scattered light or fluorescence signal intensity threshold value may be used. A threshold value also may be set for each sequence data.

Although the acquired signal strength value may be used as is for the sequence data 576a, 576b, and 576c, processing such as noise removal, baseline correction, and normalization also may be performed as necessary. In the present specification, the "numerical data corresponding to the signal strength" may include the acquired signal strength value itself and a value subjected to noise removal, baseline correction, and alization as necessary.

Taking FIG. 23 as an example, the outline of training of the third artificial intelligence algorithm 550 and the fourth artificial intelligence algorithm 553 having a neural network structure will be described. The third artificial intelligence algorithm 550 is an algorithm for classifying neutrophils, lymphocytes, monocytes, eosinophils, basophils, and immature granulocytes, and the fourth artificial intelligence algorithm 553 is an algorithm for classifying abnormal cells. The third artificial intelligence algorithm 550 and the fourth artificial intelligence algorithm 553 are preferably convolutional neural networks. The number of nodes of the input layer 550a in the third artificial intelligence algorithm 550 corresponds to the number of sequences included in the waveform data of the input training data 575. The training data 575 is combined so that the time points when the sequence data 576a, 576b, and 576c acquire the signal strength are the same points, and the training data is input to the input layer 550a of the third artificial intelligence algorithm 550 as the first training data. The label value 577 of each waveform data of the training data 575 is input to the output layer 550b of the third artificial intelligence algorithm 550 as the second training data, and used to train a third artificial intelligence algorithm 550. Reference numeral 550c in FIG. 23 indicates an intermediate layer. The fourth artificial intelligence algorithm 553 has a similar configuration.

(2) Analysis Data Generation and Cell Analysis Method

Figure 25:
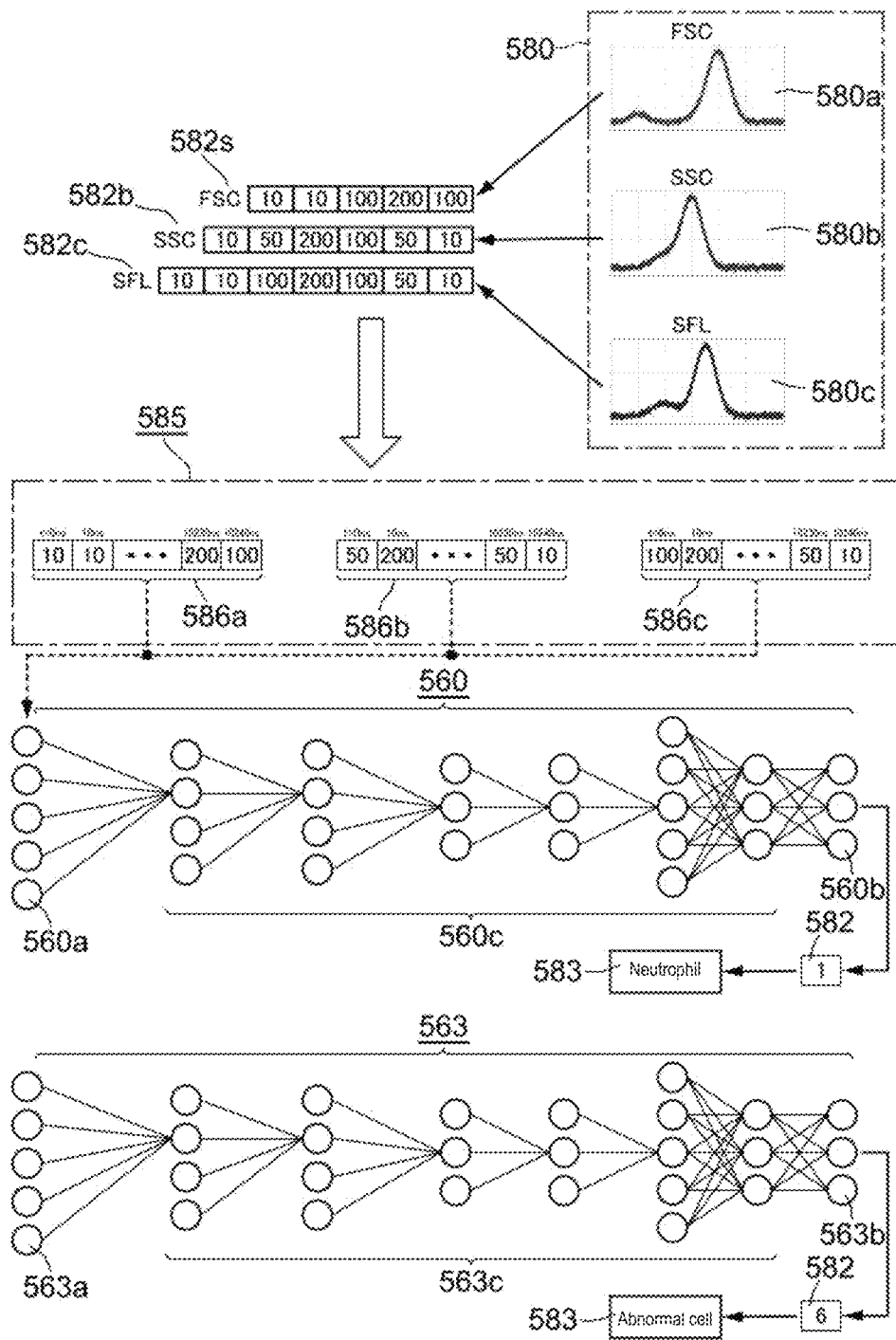
FIG. 25 shows an example of a method of generating analysis data.

FIG. 25 shows an example of a method for analyzing waveform data of cells to be analyzed. In the cell analysis method using the waveform data, the analysis data 585 are generated from the waveform data 580a of the forward scattered light, the waveform data 580b of the lateral scattered light, and the waveform data 580c of the lateral fluorescence acquired from the analysis target cells. The waveform data 580a, the waveform data 580b, and the waveform data 580c are collectively referred to as the waveform data 580 for analysis. The waveform data for analysis 580a, 580b, and 580c can be acquired by using, for example, known flow cytometry. In the example shown in FIG. 25, the analysis waveform data 580a, 580b, and 580c are acquired by using Sysmex XN-1000 in the same manner as the training waveform data 570a, 570b, and 570c. The analysis waveform data 580a, 580b, and 580c are represented by raw data values, for example, forward scattered light sequence data 582a, side scattered light sequence data 582b, and side fluorescence sequence data 582c.

Regarding the generation of the analysis data 585 and the training data 575, it is preferable that at least the acquisition conditions and the conditions for generating the data to be input to the neural network from each waveform data and the like are the same. The sequence data 582a, 582b, and 582c are synchronized at the time when the signal strength is acquired for each cell to be trained, and become the sequence data is 586a (forward scattered light), the sequence data is 586b (side scattered light), and the sequence data is 586c (side fluorescence). The sequence data 586a, 586b, and 586c are combined so that the three signal intensities at the same point (the signal intensity of the forward scattered light, the signal intensity of the side scattered light, and the signal intensity of the side fluorescence) are combined so as to become a set, and the analysis data 585 are input to the third artificial intelligence algorithm 560 or the fourth artificial intelligence algorithm 563.

When the analysis data 585 are input to the input layer 560a configuring the trained third artificial intelligence algorithm 560 or the input layer 563a configuring the fourth artificial intelligence algorithm 563, the probability that the analysis target cell for which the analysis data 585 have been acquired belongs to each of the cell types input as training data is output from the output layer 560b or the input layer 563a. Reference numerals 560c and 563c in FIG. 25 indicate an intermediate layer. Further, it may be determined that the analysis target cell for which the analysis data 585 have been acquired belongs to the classification having the highest value in this probability, and the label value 582 or the like associated with the cell type may be output. The output analysis result 583 regarding the cell may be data in which the label value itself is replaced with information (for example, terminology or the like) indicating the cell type.

FIG. 25 shows an example based on the analysis data 585, wherein the third artificial intelligence algorithm 560 or the fourth artificial intelligence algorithm 563 outputs the label value "1" having the highest probability that the analysis target cell for which the analysis data 585 have been acquired, and the character data "neutrophil" corresponding to this label value is output as the analysis result 583 for the cell. Although the output of the label value may be performed by the third artificial intelligence algorithm 560 or the fourth artificial intelligence algorithm 563, but other computer programs may be used, another computer program may output the most preferable label value based on the probability calculated by the third artificial intelligence algorithm 560 or the fourth artificial intelligence algorithm 563.

2. Cell Analysis System

Figure 26:
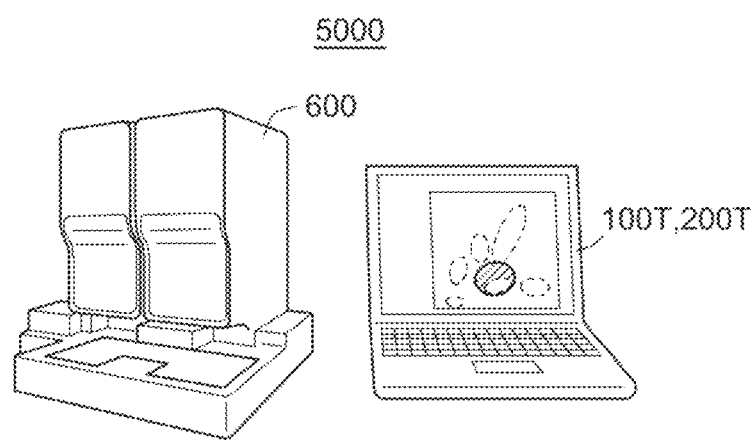
FIG. 26 shows an example of the appearance of the cell analysis system 5000.

The waveform data of this embodiment can be acquired by the cell analysis system 5000. FIG. 26 shows the appearance of the cell analysis system 5000. The cell analysis system 5000 includes a measurement unit (also referred to as a measurement unit) 600, processing units 100T and 200T in the measurement unit 600 for controlling setting and measurement of sample measurement conditions in the measurement unit 600 which can be connected by wire or wirelessly so that they can communicate with each other. The configuration example of the measurement unit 600 will be shown below, but the mode of the present embodiment is not to be construed as being limited to the following examples. The processing unit 100T or the processing unit 200T can be shared with the training device 100T or the cell analysis device 200T, which will be described later. Here, an example in which the training device 100T or the cell analysis device 200T is used as the processing unit 100T or the processing unit 200T will be described.

2-1. First Cell Analysis System 5000

(1) Structure of First Measurement Unit

A structural example will be described with reference to FIGS. 26 to 28 when the measurement unit 600 is a flow cytometer for detecting nucleated cells in a blood sample.

Figure 27:
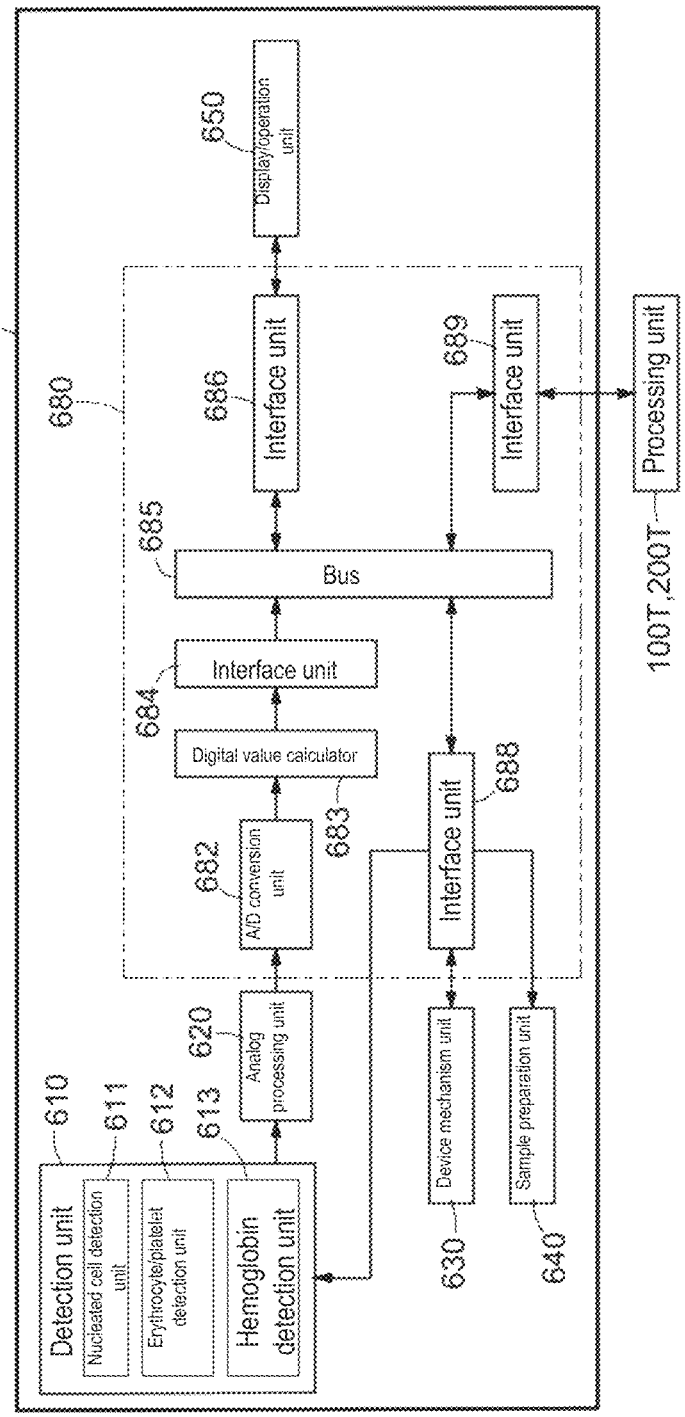
FIG. 27 shows an example of a function structure of the measurement unit 600.

FIG. 27 shows an example of a function structure of the measurement unit 600; As shown in this figure, the measurement unit 600 includes a detection unit 610 for detecting blood cells, an analog processing unit 620 for the output of the detection unit 610, a measurement unit control unit 680, a display/operation unit 650, a sample preparation unit 640, and a device mechanism unit 630. The analog processing unit 620 performs processing including noise removal on the electric signal as an analog signal input from the detection unit, and outputs the processed result to the A/D conversion unit 682 as an electric signal.

The detection unit 610 functions as a signal acquisition unit, and has a nucleated cell detection unit 611 that detects at least nucleated cells such as white blood cells, an erythrocyte/platelet detection unit 612 that measures the number of erythrocytes and platelets, and if necessary, and a hemoglobin detection unit 613 for measuring the amount of blood pigment in the blood cells. Note that the nucleated cell detection unit 611 is composed of an optical detection unit, and more specifically, has a configuration for performing detection by a flow cytometry method.

As shown in FIG. 27, the measurement unit control unit 680 includes an A/D conversion unit 682, a digital value calculation unit 683, and an interface unit 689 connected to the training device 100T or the cell analysis device 200T. The measurement unit control unit 680 includes an interface unit 486 interposed between the display/operation unit 650 and an interface unit 688 interposed between the device mechanism unit 630.

Note that the digital value calculation unit 683 is connected to the interface unit 689 via the interface unit 684 and the bus 685. The interface unit 689 is connected to the display/operation unit 650 via the bus 685 and the interface unit 486, and is connected to the detection unit 610, the device mechanism unit 630, and the sample preparation unit 640 via the bus 685 and the interface unit 688.

The A/D conversion unit 682 converts the received light signal, which is an analog signal output from the analog processing unit 620, into a digital signal and outputs the converted signal to the digital value calculation unit 683. The digital value calculation unit 683 performs a predetermined calculation process on the digital signal output from the A/D conversion unit 682. A predetermined arithmetic processing includes, for example, during the period after the forward scattered light reaches a predetermined threshold value while acquisition of the signal intensity of the forward scattered light, the signal intensity of the side scattered light, and the signal intensity of the side fluorescence is started and before acquisition ends after a predetermined time, a process of acquiring each waveform data at a plurality of time points at a fixed interval for one training target cell and a process of extracting the peak value of the waveform data, although the invention is not limited to this. Then, the digital value calculation unit 683 outputs the calculation result (measurement result) to the training device 100T or the cell analysis device 200T via the interface unit 684, the bus 685, and the interface unit 689.

The training device 100T or the cell analysis device 200T is connected to the digital value calculation unit 683 via the interface unit 684, the bus 685, and the interface unit 689, such that the training device 100T or the cell analysis device 200T can receive the calculation result output from the digital value calculation unit 683. The training device 100T or the cell analysis device 200T controls the device mechanism unit 630 including a sampler (not shown) for automatically supplying the sample container, a fluid system for preparing and measuring the sample, and other controls.

The nucleated cell detection unit 611 flows a measurement sample containing cells through a flow path for cell detection, irradiates light on the cells flowing through the flow path for cell detection, and measures scattered light and fluorescence generated from the cells. The erythrocyte/platelet detection unit 612 flows a measurement sample containing cells through a cell detection channel, measures the electrical resistance of the cells flowing through the cell detection channel, and detects the cell volume.

In the present embodiment, the measurement unit 600 preferably includes a flow cytometer and/or a sheath flow electric resistance type detection unit. In FIG. 27, the nucleated cell detection unit 611 can be a flow cytometer. In FIG. 27, the erythrocyte/platelet detection unit 612 may be a sheath flow electrical resistance type detection unit. Here, nucleated cells may be measured by the erythrocyte/platelet detection unit 612, and erythrocytes and platelets may be measured by the nucleated cell detection unit 611.

(2) Flow Cytometer

Figure 28:
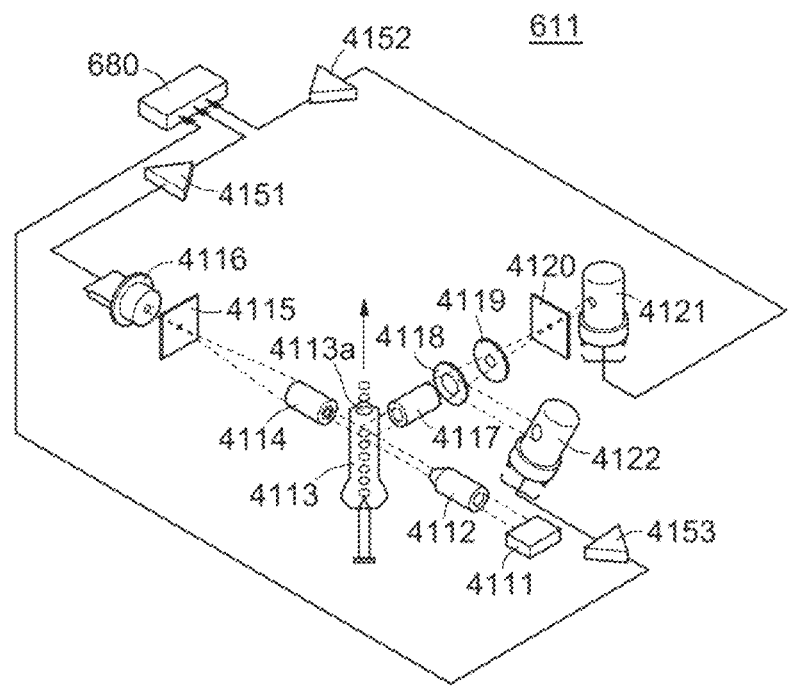
FIG. 28 shows a schematic example of the optical system of the nucleated cell detection unit 611 of the measurement unit 600.

In the measurement by the flow cytometer shown in FIG. 28, when the cells contained in the measurement sample pass through the flow cell (sheath flow cell) 4113 provided in the flow cytometer, a light source 4111 irradiates the flow cell 4113 with light, and the scattered light and fluorescence emitted via this irradiation light from the cells in the flow cell 4113 are detected.

In the present embodiment, the scattered light is not particularly limited as long as it is scattered light that can be measured by a flow cytometer that is generally distributed. For example, scattered light includes forward scattered light (for example, a light receiving angle of around 0 to 20 degrees) and side scattered light (light receiving angle of around 90 degrees). It is known that side scattered light reflects internal information of cells such as cell nuclei and granules, and forward scattered light reflects information on cell size. In the present embodiment, it is preferable to measure the forward scattered light intensity and the side scattered light intensity as the scattered light intensity.

Fluorescence is the light emitted from the fluorescent dye when energized by the excitation light of an appropriate wavelength with respect to the fluorescent dye bound to the nucleic acid in the cell. The excitation light wavelength and the received light wavelength depend on the type of fluorescent dye used.

FIG. 28 shows a structural example of the optical system of the nucleated cell detection unit 611. In this drawing, the light emitted from the laser diode, which is the light source 4111, irradiates the cells passing through the flow cell 6113 via the irradiation lens system 4112.

In the present embodiment, the light source 4111 of the flow cytometer is not specifically limited, and a light source 4111 having a wavelength suitable for exciting the fluorescent dye is selected. As such a light source 4111, for example, a semiconductor laser including a red semiconductor laser and/or a blue semiconductor laser, a gas laser such as an argon laser and a helium-neon laser, a mercury arc lamp, and the like may be used. In particular, semiconductor lasers are suitable because they are much cheaper than gas lasers.

As shown in FIG. 28, the forward scattered light emitted from the particles passing through the flow cell 4113 is received by the forward scattered light receiving element 4116 via the condenser lens 4114 and the pinhole portion 4115. The forward scattered light receiving element 4116 may be a photodiode or the like. The side scattered light is received by the side scattered light receiving element 4121 via the condenser lens 4117, the dichroic mirror 4118, the bandpass filter 4119, and the pinhole portion 4120. The side scattered light receiving element 4121 can be a photodiode, a photomultiplier, or the like. The side fluorescence is received by the side fluorescence light receiving element 4122 via the condenser lens 4117 and the dichroic mirror 4118. The side fluorescence light receiving element 4122 may be an avalanche photodiode, a photomultiplier, or the like.

The received light signals output from the light receiving elements 4116, 4121 and 4122 are subjected to analog processing such as amplification and waveform processing by the analog processing unit 620 shown in FIG. 27 having amplifiers 4151, 4152 and 4153, respectively, and sent to the control unit 680 of the measurement unit.

Figure 29:
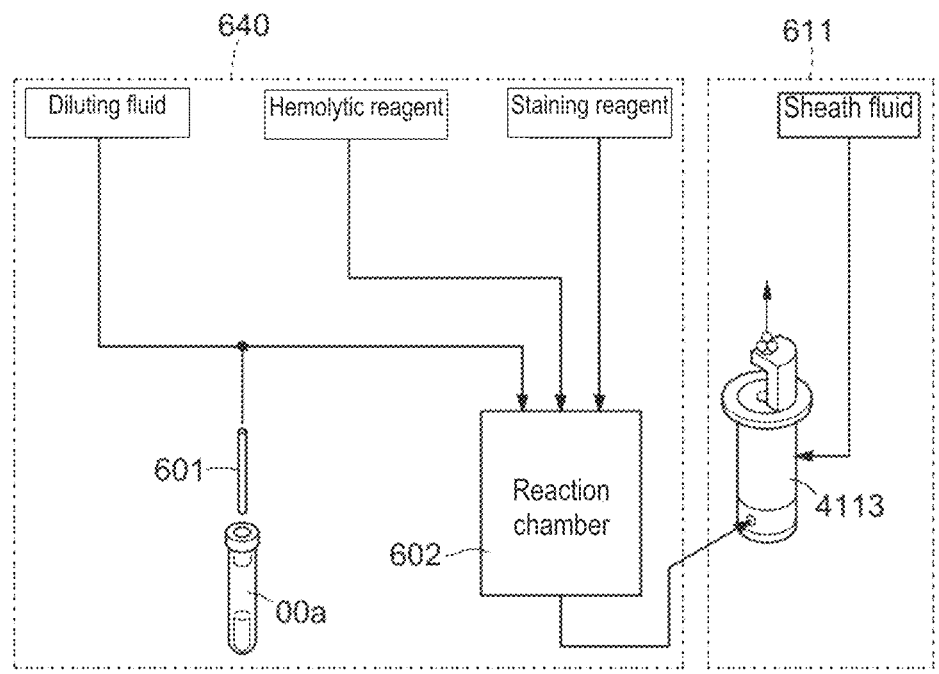
FIG. 29 shows a schematic example of the sample preparation unit 640 of the measurement unit 600.

Returning to FIG. 27, the measurement unit 600 may include a sample preparation unit 640 for preparing a measurement sample. The sample preparation unit 640 is controlled by the information control unit 481 of the measurement unit via the interface unit 688 and the bus 685. In FIG. 29, a sample preparation unit 640 provided in the measurement unit 600 prepares a measurement sample by mixing a blood sample, a staining reagent, and a hemolytic reagent, and the obtained measurement sample is measured by a nucleated cell detection unit.

In FIG. 29, the blood sample in the sample container 00a is suctioned from the suction pipette 601. The blood sample quantified by the suction pipette 601 is mixed with a predetermined amount of diluting liquid and transported to the reaction chamber 602. A predetermined amount of hemolytic reagent is added to the reaction chamber 602. A predetermined amount of staining reagent is supplied to the reaction chamber 602 and mixed with the above mixture. By reacting a mixture of a blood sample with a staining reagent and a hemolytic reagent in a reaction chamber 602 for a predetermined time, red blood cells in the blood sample are hemolyzed, and a measurement sample in which nucleated cells are stained with a fluorescent dye is obtained.

The obtained measurement sample is sent to the flow cell 4113 in the nucleated cell detection unit 611 together with a sheath solution (for example, Cellpack (II), manufactured by Sysmex Corporation), and is measured by a flow cytometry method in the nucleated cell detection unit 611.

2-2. Training device 100T/200T

(1) Training Device Hardware Structure

Figure 30:
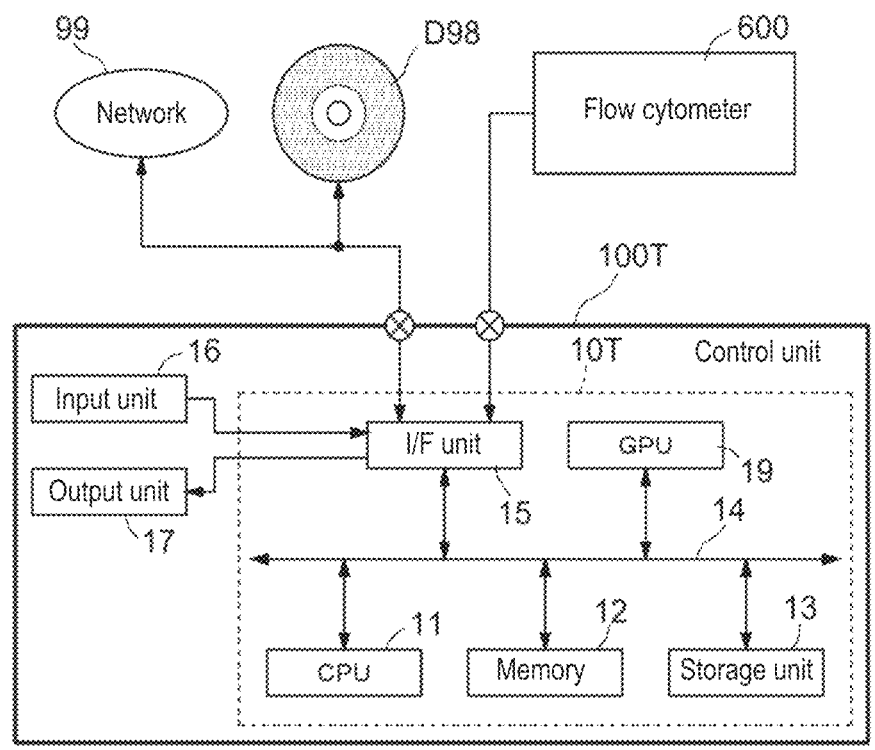
FIG. 30 shows a structural example of hardware of the training device.

FIG. 30 illustrates an example of the hardware structure of the training device 100T. The training device 200A includes a control unit 20A, an input unit 26, and an output unit 27. The training device 100T can be connected to the network 99.

The Structure of the control unit 10T is the same as the structure of the control unit 20A of the training device 200A. Here, the CPU 21, the memory 22, the storage unit 23, the bus 24, the I/F unit 25, and the GPU 29 in the control unit 20A of the training device 200A shall be read as the CPU 11, the memory 12, the storage unit 13, the bus 14, and the I/F unit 15, and GPU 19, respectively. However, the storage unit 13 stores the third artificial intelligence algorithm 550 and the fourth artificial intelligence algorithm 560.

The training waveform data 570 can be acquired by the measurement unit 600 and stored in the storage unit 13 or the memory 12 of the control unit 10T of the training device 100T.

(2) Analysis Device Hardware Structure

Figure 31:
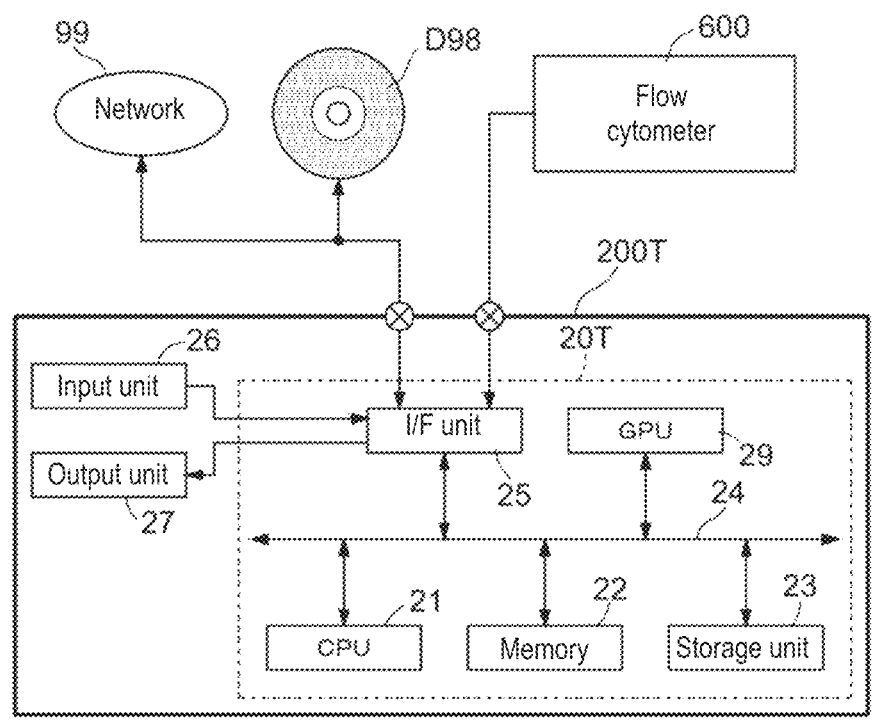
FIG. 31 shows a structural example of hardware of a cell analysis device.

Referring to FIG. 31, the cell analysis device 200T includes a control unit 20, an input unit 26, an output unit 27, and a media drive D98. The cell analysis device 200T can be connected to the network 99.

The structure of the control unit 20T is the same as the structure of the control unit 40A of the cell analysis device 400A. Here, the CPU 41, the memory 42, the storage unit 43, the bus 44, the I/F unit 45, and the GPU 49 in the control unit 40A of the training device 400A shall be read as the CPU 21, the memory 22, the storage unit 23, the bus 24, and the I/F unit 25, and GPU 29, respectively. However, the storage unit 23 stores a plurality of trained third artificial intelligence algorithms 560 as a database shown in FIG. 32, which will be described later.

The training waveform data 580 can be acquired by the measurement unit 600 and stored in the storage unit 23 or the memory 22 of the control unit 20T of the training device 200T.

(3) Function Structure of Training Device

Figure 32:
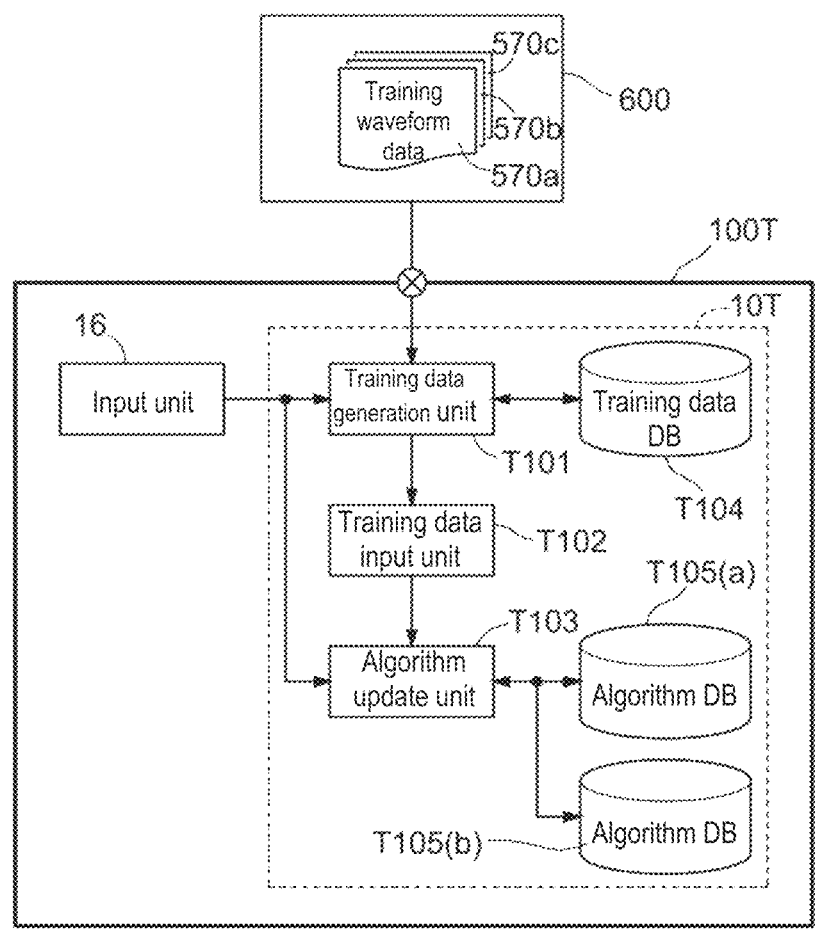
FIG. 32 shows an example of a function structure of a training device.

Referring to FIG. 32, the control unit 10T of the training device 100T includes a training data generation unit T101, a training data input unit T102, and an algorithm update unit T103. Step S1001 shown in FIG. 34 corresponds to the training data generation unit T101. Step S1002 shown in FIG. 34 corresponds to the training data input unit T102. Step S1004 shown in FIG. 34 corresponds to the algorithm update unit T103. The training data database (DB) T104 and the algorithm databases (DB) T105(a) and T105(b) can be recorded in the storage unit 13 of the control unit 10T.

The training waveform data 570a, 570b, and 570c are acquired in advance by the measurement unit 600 and stored in advance in the training data database T104(a) of the control unit 10T. The third artificial intelligence algorithm 550 is stored in advance in the algorithm database T105(b).

(4) Function Structure of Cell Analysis Device

Figure 33:
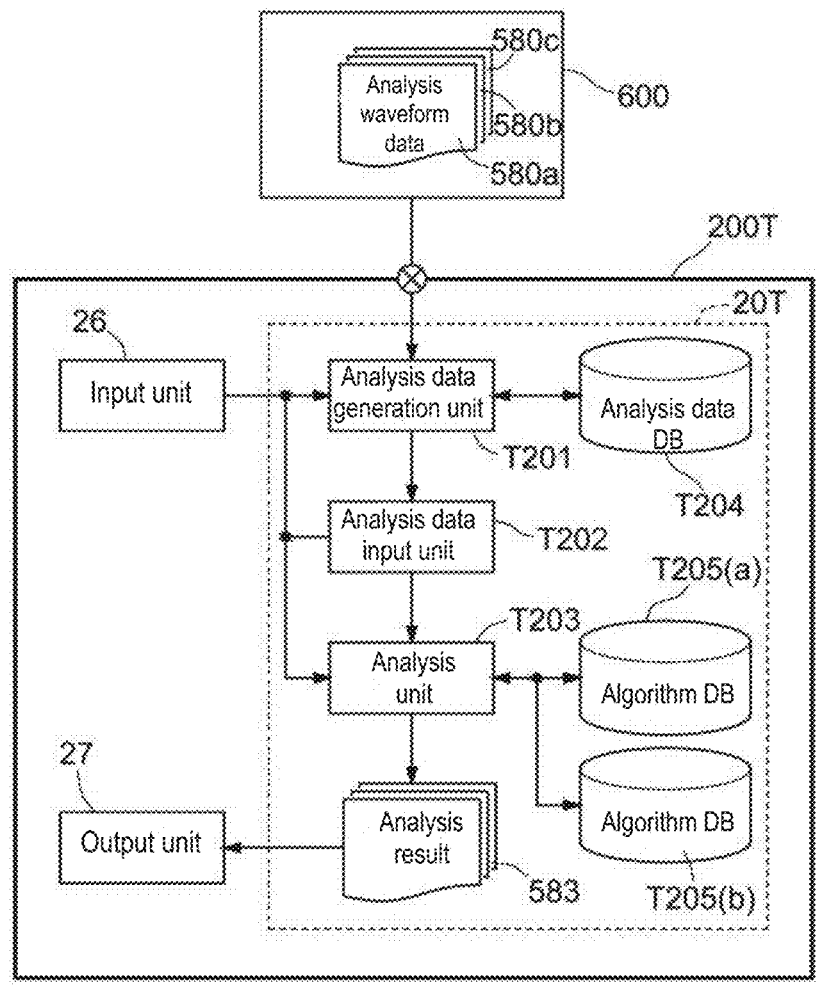
FIG. 33 shows an example of a function structure of a cell analysis device.

FIG. 33 shows the function structure of the cell analyzer 200T. The cell analysis device 200T includes an analysis data generation unit T201, an analysis data input unit T202, an analysis unit T203, an analysis data database (DB) T204, and an algorithm database (DB) T205(a) and T205(b). Step S2001 shown in FIG. 35 corresponds to the analysis data generation unit T201. Step S2002 shown in FIG. 35 corresponds to the analysis data input unit T202. Step S2003 shown in FIG. 35 corresponds to the analysis unit T403. The waveform data 580 for analysis are acquired by the measurement unit 600 and stored in the analysis data database T204. The plurality of trained third artificial intelligence algorithms 560 are stored in the algorithm database T205(a). The fourth artificial intelligence algorithm 563 is stored in the algorithm database T205(b).

(5) Training Process

Figure 34:
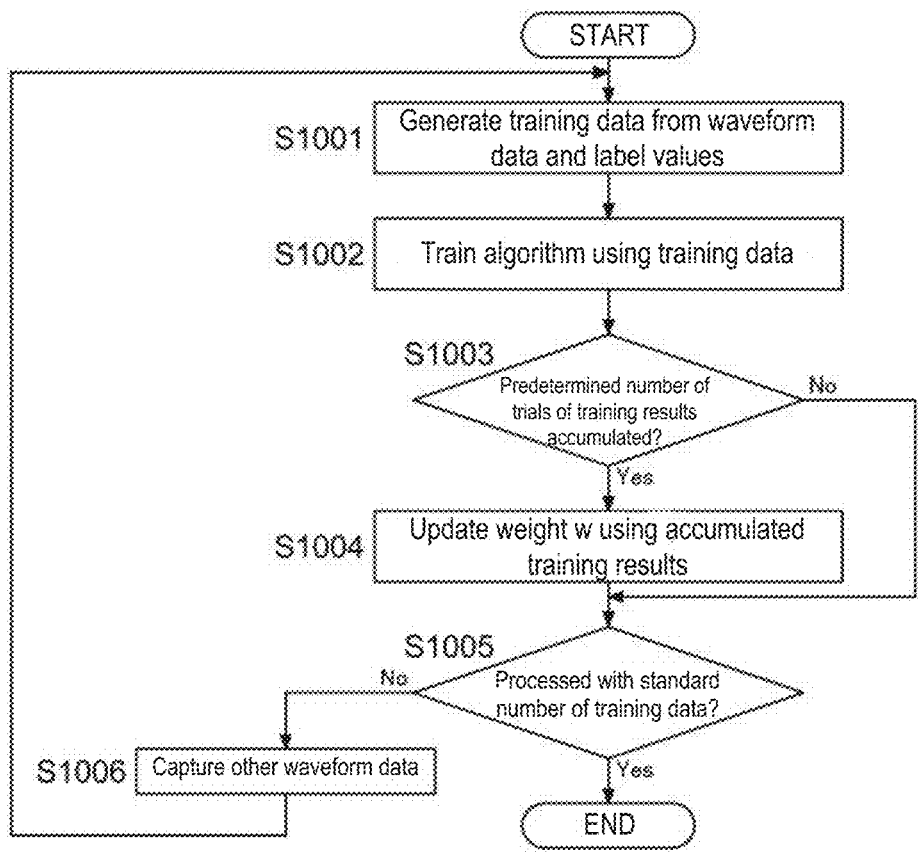
FIG. 34 shows a flowchart of a training process of the third and fourth artificial intelligence algorithms.

FIG. 34 shows an example of the processing performed by the control unit 10T of the training device 100T.

First, the control unit 10T acquires training waveform data 570a, 570b, 570c. The training waveform data 570a are the waveform data of the forward scattered light, the training waveform data 570b are the waveform data of the side scattered light, and the training waveform data 570c are the waveform data of the side fluorescence. The acquisition of the training waveform data 570a, 570b, 570c is taken from the measurement unit 600 or taken from the media drive D98 by an operation of the operator via the I/F section 15 and the network. When the training waveform data 570a, 570b, 570c are acquired, information indicating which cell type the training waveform data 570a, 570b, 570c represents is also acquired. The information indicating which cell type is represented is tied to the training waveform data 570a, 570b, 570c, or the operator may input such from the input unit 16.

In step S1001, the control unit 10T associates information indicating the cell type associated with the training waveform data 570a, 570b, and 570c, a label value associated with the cell type stored in the memory 12 or the storage unit 13, and a label value 577 corresponding to sequence data 576a, 576b, 576c synchronized with the waveform data of the forward scattered light, side scattered light, and side fluorescent light during waveform data acquisition with the sequence data 572a, 572b, 572c. Thus, the control unit 10T generates training data 575.

In step S1002, the control unit 10T trains the third artificial intelligence algorithm 550 or the fourth artificial intelligence algorithm 553 using the training data 575. The training results of the third artificial intelligence algorithm 550 and the fourth artificial intelligence algorithm 553 are accumulated each time training is performed using a plurality of training data 575. When the label value 577 of the training data 575 indicates neutrophils, lymphocytes, monocytes, eosinophils, basophils, and immature granulocytes, the third artificial intelligence algorithm 550 is trained, whereas when the label value 577 of 575 indicates abnormal cells, the fourth artificial intelligence algorithm 553 is trained.

In the cell type analysis method according to the present embodiment, since a convolutional neural network and a stochastic gradient descent method are used, in step S1003, the control unit 10T determines whether the accumulated training results have reached a predetermined number of training cycles. When the training results have accumulated for a predetermined number of cycles (when "YES"), the control unit 10T proceeds to the process of step S1004, and when the training results have not accumulated for a predetermined number of cycles ("NO"), the control unit 10T proceeds to the process of step S15.

Next, when the training results are accumulated for a predetermined number of cycles, in step S1004, the control unit 10T uses the training results accumulated in step S1002 to update the weight w of the third artificial intelligence algorithm 550 or the fourth artificial intelligence algorithm 553. Since the cell type analysis method according to the present embodiment uses the stochastic gradient descent method, the weight w of the third artificial intelligence algorithm 550 or the fourth artificial intelligence algorithm 553 is updated at the stage at which the training results for a predetermined number of trials are accumulated.

In step S1005, the control unit 10T determines whether the third artificial intelligence algorithm 550 or the fourth artificial intelligence algorithm 553 has been trained with the specified number of training data 575. When training is performed with the specified number of training data 575 (in the case of "YES"), the training process is terminated.

When the control unit 10T determines in step S1005 that the third artificial intelligence algorithm 550 or the fourth artificial intelligence algorithm 553 has not been trained with the specified number of training data 575 (in the case of "NO"), the routine advances from step S1005 to step S1006, and the next training waveform data 570 is processed from step S1001 to step S1005.

According to the process described above, the control unit 10T trains the third artificial intelligence algorithm 550 and the fourth artificial intelligence algorithm 553, and generates the third artificial intelligence algorithm 560 and the fourth artificial intelligence algorithm 563. The third artificial intelligence algorithm 560 and the fourth artificial intelligence algorithm 563 can be recorded on one computer.

(6) Cell Analysis Process

First, the control unit 20T acquires analysis waveform data 580a, 580b, and 580c. The acquisition of the waveform data for analysis 580a, 580b, and 580c can be performed by the user's operation or automatically from the measurement unit 600, from the recording medium 98, or via the I/F unit 25 via the network.

Figure 35:
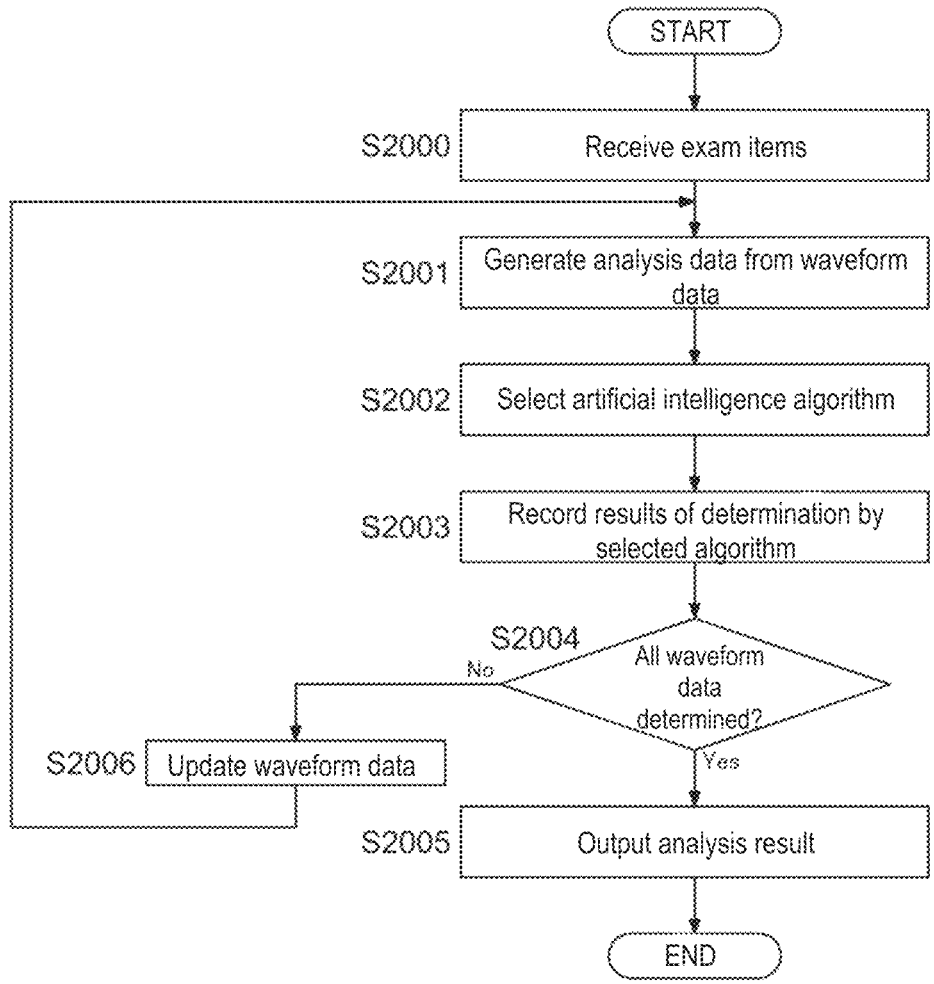
FIG. 35 shows a flowchart of a cell analysis process.

In step S2000 shown in FIG. 35, the control unit 20T receives an exam item by the input unit 26. Specifically, the exam item is accepted by reading the information about the exam item from the barcode attached to each sample by the barcode reader which is an example of the input unit 46. The exam item is selected from "blood cell classification test" and "abnormal cell test". In step S2001, the control unit 20T generates analysis data 585 for cells from the sequence data 582a, 582b, 582c according to the procedure described in the above cell analysis method. The control unit 20T stores the generated analysis data 585 in the storage unit 23 or the memory 22.

In step S2002, the control unit 20T selects the third artificial intelligence algorithm 560 or the fourth artificial intelligence algorithm 563 according to the exam item received in step S2000. The control unit 20T selects the third artificial intelligence algorithm 560 when the exam item is "blood cell classification test", and selects the fourth artificial intelligence algorithm 563 when the exam item is "abnormal cell test".

In step S2003, the control unit 20T classifies the analysis target cells using the third artificial intelligence algorithm 560 or the fourth artificial intelligence algorithm 563 selected in step S2003, and stores the label value 577 of the determination result in the storage unit 43 or the memory 42.

The control unit 20T determines whether all the analysis target cells have been determined in step S2004, and if all have been determined (in the case of "YES"), proceeds to step S2005 and determines the determination result, and outputs the determination result to the output unit. If not all have been determined in step S2004 (in the case of "NO"), the control unit 20T updates the analysis target cells in step S2006 and repeats steps S2001 to S2004 until all the determinations are made.

According to each of the above-described embodiments, it is possible to determine the cell type regardless of the skill of the inspector. It also facilitates the analysis of a plurality of analysis items in cell analysis.

(7) Various Programs

A second embodiment includes a computer program for training an artificial intelligence algorithm that causes a computer to perform the processes of steps S1001 to S1006.

A second embodiment includes a computer program for analyzing cells that causes a computer to perform the processes of steps S2000-S2006 and S2201-S2002.

An implementation of the present embodiment relates to a program product such as a storage medium that stores the computer program. That is, the computer program can be stored on a hard disk, a semiconductor memory element such as a flash memory, or a storage medium such as an optical disk. The recording format of the program on the storage medium is not limited insofar as the training device 200A can read the program. Recording on the storage medium is preferably non-volatile.

Here, the "program" is a concept including not only a program that can be directly executed by the CPU, but also a source format program, a compressed program, an encrypted program, and the like.

IV. Other

The present invention shall not be construed as being limited to the embodiments described above. For example, in the above embodiment, the algorithm to be used is selected according to the received exam item, but the algorithm to be used also may be selected according to the received analysis item after receiving the analysis item.

What is claimed is:

1. A cell analysis method for analyzing cells, comprising:
receiving an exam item, an analysis item, or an analysis mode;
generating image data representative of respective cells for analysis that are contained in a sample;
selecting one artificial intelligence algorithm, from a plurality of artificial intelligence algorithms stored in a storage unit, based on the received exam item, analysis item, or analysis mode, wherein the plurality of artificial intelligence algorithms each comprise a deep learning algorithm having a neural network structure in which intermediate layers are weighted through training specific to the exam item, the analysis item, or the analysis mode to analyze the image data of the respective cells for analysis to determine whether each of the cells for analysis is normal or abnormal;
inputting the generated image data to the selected one of the plurality of artificial intelligence algorithms;
analyzing the generated image data by the selected one of the plurality of artificial intelligence algorithms; and
through analysis of the image data of the respective cells for analysis by the selected one of the plurality of artificial intelligence algorithms, generating an analysis report indicating whether each of the cells for analysis is normal or abnormal.

2. The cell analysis method according to claim 1, further comprising:
flowing a sample containing the cells for analysis into a flow path; and
imaging the cells for analysis passing through the flow path and generating the image data of the respective cells for analysis.

3. The cell analysis method according to claim 2, wherein the analysis target images include a plurality of images for the respective cells for analysis, and the image data is generated from each of the plurality of images for the respective cells for analysis.

4. The cell analysis method according to claim 3, wherein the plurality of images for the respective cells for analysis include a first fluorescence image which includes an optically captured first fluorescence label present in a nucleus, and a second fluorescence image which includes an optically captured second fluorescence label present in the nucleus.

5. The cell analysis method according to claim 3, wherein the plurality of images for the respective cells for analysis include a bright field image of a respective cell and a fluorescence image of a fluorescent label of the respective cell.

6. The cell analysis method according to claim 3, wherein one analysis target image is selected from the analysis target images, based on the received test item or analysis item, to generate the image data.

7. The cell analysis method according to claim 1, further comprising:
flowing a sample containing the cells for analysis into a flow path; and
acquiring signal strengths representative of optical images of the respective cells for analysis passing through the flow path, wherein the image data of the respective cells for analysis is generated from the signal strengths.

8. The cell analysis method according to claim 1, further comprising:
capturing, by a microscope, images of the cells for analysis that are smeared and placed on a slide of the microscope; and
generating analysis target images of the respective cells for analysis from the captured images of the cells for analysis, wherein the image data is generated from the analysis target images.

9. The cell analysis method according to claim 1, further comprising receiving a plurality of analysis modes and selecting one analysis mode from the plurality of analysis modes, wherein the one artificial intelligence algorithm is selected based on the selected one of the plurality of analysis modes.

10. The cell analysis method according to claim 9, wherein the one analysis mode is selected via a mode reception screen displayed for selecting the one analysis mode among the plurality of analysis modes.

11. The cell analysis method according to claim 1, wherein the plurality of artificial intelligence algorithms comprise at least one algorithm for analyzing the image data to determine whether or not a cell has a chromosomal abnormality, and at least one algorithm for analyzing the image data to determine whether or not a cell is a peripheral circulating tumor cell.

12. The cell analysis method according to claim 1, wherein the plurality of artificial intelligence algorithms are all stored in one computer.

13. A cell analysis device for analyzing cells, comprising:
a control unit comprising a processing unit and a storage unit that stores a plurality of artificial intelligence algorithms and configured to:
receive an exam item, an analysis item, or an analysis mode;
select one artificial intelligence algorithm from the plurality of artificial intelligence algorithms stored in the storage unit, based on the received exam item, analysis item, or analysis mode;
input image data to the selected one of the plurality of artificial intelligence algorithms, wherein the image data is representative of respective cells for analysis that are contained in a sample, and the plurality of artificial intelligence algorithms each comprise a deep learning algorithm having a neural network structure in which intermediate layers are weighted through training specific to the exam item, the analysis item, or the analysis mode to analyze the image data of the cells for analysis to determine whether a respective cell for analysis is normal or abnormal;
analyze the image data by the selected one of the plurality of artificial intelligence algorithms; and
through analysis of the image data of the respective cells for analysis by the selected one of the plurality of artificial intelligence algorithms, generate an analysis report indicating whether each of the cells for analysis is normal or abnormal.

14. A cell analysis system comprising:
a flow cell having a flow path configured to flow a sample containing cells for analysis therethrough;
a light source configured to irradiate light to the sample flowing through the flow path;
an imaging unit comprising a camera and configured to capture images of the respective cells for analysis in the sample irradiated with the light; and
a control unit comprising a processing unit and a storage unit that stores a plurality of artificial intelligence algorithms, wherein
the control unit is configured to:
receive an exam item, an analysis item, or an analysis mode;
generate image data representative of the respective cells for analysis, wherein the image data is generated from the images of the respective cells for analysis captured by the imaging unit;
select one artificial intelligence algorithm, from the plurality of artificial intelligence algorithms stored in the storage unit, based on the received exam item, analysis item, or analysis mode, wherein the plurality of artificial intelligence algorithms each comprise a deep learning algorithm having a neural network structure in which intermediate layers are weighted through training specific to the exam item, the analysis item, or the analysis mode to analyze the image data of the cells for analysis to determine whether each of the cells for analysis is normal or abnormal;
input the generated image data to the selected one of the plurality of artificial intelligence algorithms;
analyze the inputted image data by the selected one of the plurality of artificial intelligence algorithms; and
through analysis of the input image data by the selected one of the plurality of artificial intelligence algorithms, generate an analysis report indicating whether each of the cells for analysis is normal or abnormal.

15. A cell analysis system comprising:
a flow cell having a flow path configured to flow a sample containing cells for analysis therethrough;
a signal acquiring unit configured to acquire signals representative of optical characteristics of the cells for analysis flowing through the flow path; and
a control unit comprising a processing unit and a storage unit that stores a plurality of artificial intelligence algorithms, wherein
the control unit is configured to:
receive an exam item, an analysis item, or an analysis mode;
receive the signals from the signal acquiring unit;
generate image data representative of the respective cells for analysis, wherein the image data is generated from the received signals;
select one artificial intelligence algorithm, from the plurality of artificial intelligence algorithms stored in the storage unit, based on the received exam item, analysis item, or analysis mode, wherein the plurality of artificial intelligence algorithms each comprise a deep learning algorithm having a neural network structure in which intermediate layers are weighted through training specific to the exam item, the analysis item, or the analysis mode to analyze the image data of the cells for analysis to determine whether each of the cells for analysis is normal or abnormal;
analyze the generated image data by the selected one of the plurality of artificial intelligence algorithms; and
through analysis of the generated image data by the selected one of the plurality of artificial intelligence algorithms, generate an analysis report indicating whether each of the cells for analysis is normal or abnormal.

16. A cell analysis system comprising:
a microscope with a stage and a slide placed on the stage, a smeared sample containing cells for analysis being placed on the slide;
an imaging unit configured to capture images of the respective cells for analysis magnified by the microscope; and
a control unit comprising a processing unit and a storage unit that stores a plurality of artificial intelligence algorithms, wherein
the control unit is configured to:
receive an exam item, an analysis item, or an analysis mode;
generate image data representative of the respective cells for analysis, wherein the image data is generated from the images of the respective cells for analysis captured by the imaging unit;

select one artificial intelligence algorithm, from the plurality of artificial intelligence algorithms stored in the storage unit, based on the received exam item, analysis item, or analysis mode, wherein the plurality of artificial intelligence algorithms each comprise a deep learning algorithm having a neural network structure in which intermediate layers are weighted through training specific to the exam item, the analysis item, or the analysis mode to analyze the image data of the cells for analysis to determine whether each of the cells for analysis is normal or abnormal;

input the generated image data to the selected one of the plurality of artificial intelligence algorithms;

analyze the inputted image data by the selected one of the plurality of artificial intelligence algorithms; and through analysis of the inputted image data by the selected one of the plurality of artificial intelligence algorithms, generate an analysis report indicating whether each of the cells for analysis is normal or abnormal.

* * * * *